United States Patent
Meeker et al.

(10) Patent No.: US 7,658,446 B2
(45) Date of Patent: Feb. 9, 2010

(54) INFANT CARRIER AND RECEIVING BASE

(75) Inventors: Paul K. Meeker, Hiram, OH (US); William R. Gibson, Kent, OH (US)

(73) Assignee: Meeker R & D, Inc., Hiram, OH (US)

( * ) Notice: Subject to any disclaimer, the term of this patent is extended or adjusted under 35 U.S.C. 154(b) by 120 days.

(21) Appl. No.: 10/906,191

(22) Filed: Feb. 8, 2005

(65) Prior Publication Data

US 2005/0110318 A1 May 26, 2005

Related U.S. Application Data

(60) Provisional application No. 60/521,063, filed on Feb. 13, 2004.

(51) Int. Cl.
*B60N 2/28* (2006.01)
(52) U.S. Cl. .............. 297/250.1; 297/256.13; 297/256.16; 297/484
(58) Field of Classification Search ............ 297/183.2, 297/183.3, 183.4, 250.1, 256.13, 256.16, 297/484, 465, 410
See application file for complete search history.

(56) References Cited

U.S. PATENT DOCUMENTS

| | | | | |
|---|---|---|---|---|
| 2,185,907 | A | 1/1940 | DeVaughn | 311/103 |
| 2,457,294 | A | 12/1948 | Wood | 155/196 |
| 3,148,636 | A | 9/1964 | Blomquist et al. | 108/26 |
| 3,475,052 | A | 10/1969 | Kaposi | 297/153 |
| 3,698,675 | A | 10/1972 | Lerew et al. | 248/311 |
| 4,174,866 | A | 11/1979 | Rhyan | 297/194 |
| 4,205,877 | A | 6/1980 | Ettridge | 297/321 |
| 4,274,674 | A | 6/1981 | Deloustal | 297/250 |
| 4,345,791 | A | 8/1982 | Bryans et al. | 297/250 |
| 4,591,206 | A | 5/1986 | Pribble | 297/148 |
| 4,606,576 | A | 8/1986 | Jones | 297/153 |
| 4,634,177 | A | 1/1987 | Meeker | 297/250 |
| 4,659,099 | A | 4/1987 | Malone | 280/289 |
| 4,662,676 | A | 5/1987 | Havelock | 297/194 |
| 4,733,909 | A | 3/1988 | Single et al. | 297/250 |
| 4,754,999 | A | 7/1988 | Kain | 297/250 |
| 4,762,364 | A | 8/1988 | Young | 297/250 |
| 4,790,601 | A * | 12/1988 | Burleigh et al. | 297/484 |
| 4,798,412 | A | 1/1989 | Kohus et al. | 297/250 |
| 4,825,590 | A | 5/1989 | Cullinane | 47/67 |
| 4,858,869 | A | 8/1989 | Stang | 248/311.2 |

(Continued)

FOREIGN PATENT DOCUMENTS

DE    41 37 599 A1    5/1993

(Continued)

OTHER PUBLICATIONS

International Preliminary Report on Patentability, Patent Cooperation Treaty.

*Primary Examiner*—Peter R. Brown
(74) *Attorney, Agent, or Firm*—Louis F. Wagner; Hahn Loeser + Parks LLP

(57) ABSTRACT

An infant carrier and car seat combination is illustrated which provides releasable lockability between the carrier and its base, infant seat belt tensioning and height adjustment, improved handle movement which resists twisting and carrier base adjustment through a movable base within the carrier base.

12 Claims, 21 Drawing Sheets

U.S. PATENT DOCUMENTS

| | | | |
|---|---|---|---|
| 4,865,237 A | 9/1989 | Allen | 224/42.45 |
| 4,928,876 A | 5/1990 | Marshall | 229/103.1 |
| 4,936,629 A | 6/1990 | Young | 297/250 |
| 4,943,113 A | 7/1990 | Meeker | 297/250 |
| 4,972,781 A | 11/1990 | Montgomery et al. | 108/25 |
| 4,998,307 A | 3/1991 | Cone | 5/94 |
| 5,010,826 A | 4/1991 | Kudlac | 108/25 |
| 5,020,755 A | 6/1991 | Frankel | 248/215 |
| 5,042,770 A | 8/1991 | Louthan | 248/311.2 |
| 5,058,283 A | 10/1991 | Wise et al. | 33/371 |
| 5,072,909 A | 12/1991 | Huang | 248/311.2 |
| 5,115,523 A | 5/1992 | Cone | 5/94 |
| 5,181,761 A | 1/1993 | Meeker | 297/250 |
| 5,183,312 A | 2/1993 | Nania | 297/250 |
| 5,277,472 A | 1/1994 | Freese et al. | 297/130 |
| 5,279,452 A | 1/1994 | Huynh | 224/42.45 |
| 5,361,950 A | 11/1994 | Signal et al. | 224/151 |
| 5,385,387 A * | 1/1995 | Kain | 297/256.16 |
| 5,413,401 A | 5/1995 | Koyanagi | 297/250.1 |
| 5,427,292 A | 6/1995 | Rousch | 224/275 |
| 5,458,394 A | 10/1995 | Nichols et al. | 297/173 |
| 5,460,102 A | 10/1995 | Pasmanick | 108/43 |
| 5,496,092 A | 3/1996 | Williams et al. | 297/250.1 |
| 5,503,297 A | 4/1996 | Frankel | 220/751 |
| 5,522,527 A | 6/1996 | Tsai | 224/414 |
| 5,551,751 A | 9/1996 | Sedlack et al. | 297/256.13 |
| 5,558,391 A | 9/1996 | Chavous | 297/153 |
| 5,567,008 A | 10/1996 | Cone | 297/256.16 |
| D376,917 S | 12/1996 | Kain | |
| 5,586,800 A | 12/1996 | Triplett | 297/148 |
| 5,609,393 A | 3/1997 | Meeker et al. | 297/256.13 |
| 5,625,956 A | 5/1997 | Cone et al. | 33/370 |
| 5,681,082 A | 10/1997 | Drexler | 297/256.1 |
| 5,681,084 A | 10/1997 | Yoneda | 297/284.9 |
| 5,685,604 A | 11/1997 | Kain | 297/256.15 |
| 5,720,226 A | 2/1998 | Padovano | 108/25 |
| 5,746,478 A | 5/1998 | Lumley et al. | 297/256.13 |
| 5,772,279 A * | 6/1998 | Johnson, Jr. | 297/130 |
| 5,813,579 A | 9/1998 | Hendrickson | 224/42.11 |
| 5,833,314 A | 11/1998 | Mitschelen et al. | 297/237 |
| 5,836,650 A | 11/1998 | Warner, Jr. et al. | 297/256.11 |
| 5,865,412 A | 2/1999 | Mason | 248/311.2 |
| 5,890,762 A | 4/1999 | Yoshida | 297/256.13 |
| 5,918,550 A | 7/1999 | Weir et al. | 108/42 |
| 5,967,345 A | 10/1999 | Subotin | 211/119.007 |
| 5,975,342 A | 11/1999 | Bradeen et al. | 220/737 |
| 6,017,088 A | 1/2000 | Stephens et al. | 297/256.16 |
| 6,030,047 A | 2/2000 | Kain | 297/484 |
| 6,033,019 A | 3/2000 | Hession-Kunz et al. | 297/250.1 |
| 6,139,101 A | 10/2000 | Berringer et al. | 297/256.1 |
| 6,155,638 A * | 12/2000 | Bapst | 297/250.1 |
| 6,170,911 B1 | 1/2001 | Kassai et al. | 297/250.1 |
| 6,193,310 B1 * | 2/2001 | Batalaris et al. | 297/253 |
| 6,196,629 B1 | 3/2001 | Onishi et al. | 297/256.12 |
| 6,216,605 B1 | 4/2001 | Chapman | 108/26 |
| 6,273,505 B1 | 8/2001 | Carnahan | 297/250.1 |
| 6,273,509 B1 * | 8/2001 | Reithmeier et al. | 297/410 |
| 6,299,249 B1 | 10/2001 | Mori | 297/256.13 |
| 6,302,033 B1 | 10/2001 | Roudebush | 108/25 |
| 6,318,799 B1 | 11/2001 | Greger et al. | 297/256.13 |
| 6,347,832 B2 | 2/2002 | Mori | 297/256.13 |
| 6,454,350 B1 | 9/2002 | Celestina-Krevh et al. | 297/216.11 |
| 6,474,735 B1 | 11/2002 | Carnahan et al. | 297/250.1 |
| 6,491,348 B1 | 12/2002 | Kain | 297/484 |
| 6,554,358 B2 | 4/2003 | Kain | 297/256.13 |
| 6,592,183 B2 | 7/2003 | Kain | 297/253 |
| 6,626,493 B2 | 9/2003 | Kain | 297/250.1 |
| 6,665,912 B2 | 12/2003 | Turner et al. | 24/171 |
| 6,672,663 B2 | 1/2004 | Kain | 297/250.1 |
| 6,672,664 B2 | 1/2004 | Yanaka | |
| 6,688,685 B2 | 2/2004 | Kain | 297/250.1 |
| 6,698,838 B2 | 3/2004 | Kain | 297/411.32 |
| 6,698,841 B1 | 3/2004 | Glover et al. | 297/484 |
| 6,705,675 B1 | 3/2004 | Eastman et al. | 297/250.1 |
| 6,705,676 B1 | 3/2004 | Berringer et al. | 297/256.16 |
| 6,796,610 B2 * | 9/2004 | Nakagawa et al. | 297/256.16 |
| 6,820,939 B1 * | 11/2004 | Chen | 297/484 |
| 6,834,915 B2 | 12/2004 | Sedlack | 297/256.13 |
| 7,055,903 B2 * | 6/2006 | Balensiefer et al. | 297/256.11 |
| 2002/0043838 A1 * | 4/2002 | Yanaka et al. | 297/250.1 |
| 2002/0195867 A1 * | 12/2002 | Barger et al. | 297/484 |
| 2004/0124678 A1 * | 7/2004 | Williams et al. | 297/256.11 |

FOREIGN PATENT DOCUMENTS

| | | |
|---|---|---|
| EP | 0 009 439 A1 | 4/1980 |
| EP | 0 426 585 A1 | 5/1991 |
| EP | 0 545 185 A1 | 6/1993 |
| GB | 2 256 364 A | 12/1992 |
| JP | 1-113007 | 5/1989 |
| JP | 1-90654 | 6/1989 |
| JP | 6 243835 | 9/1994 |
| JP | 07017312 | 1/1995 |
| JP | 10250426 A | 9/1998 |
| WO | WO 91/00193 | 10/1991 |

* cited by examiner

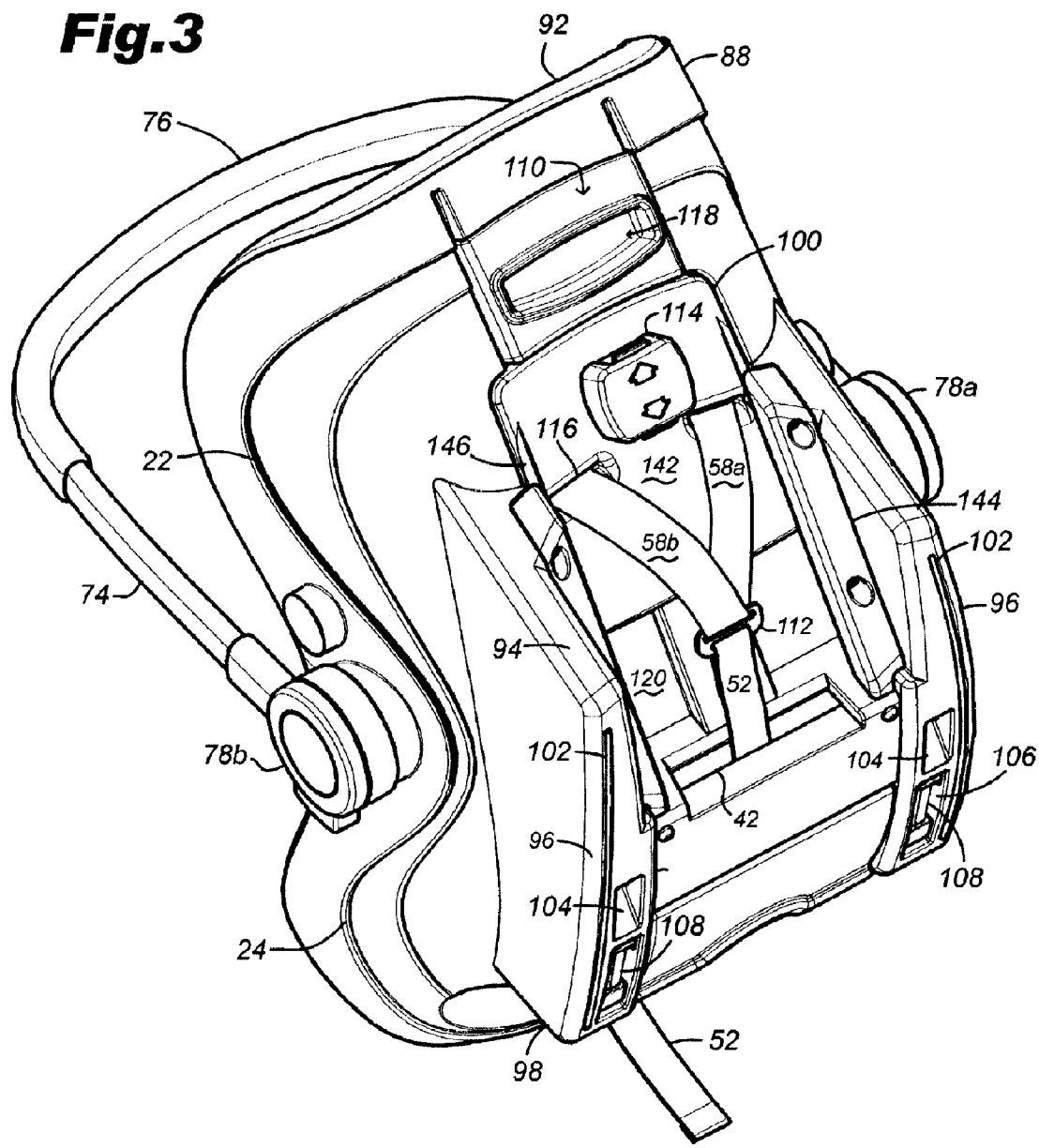

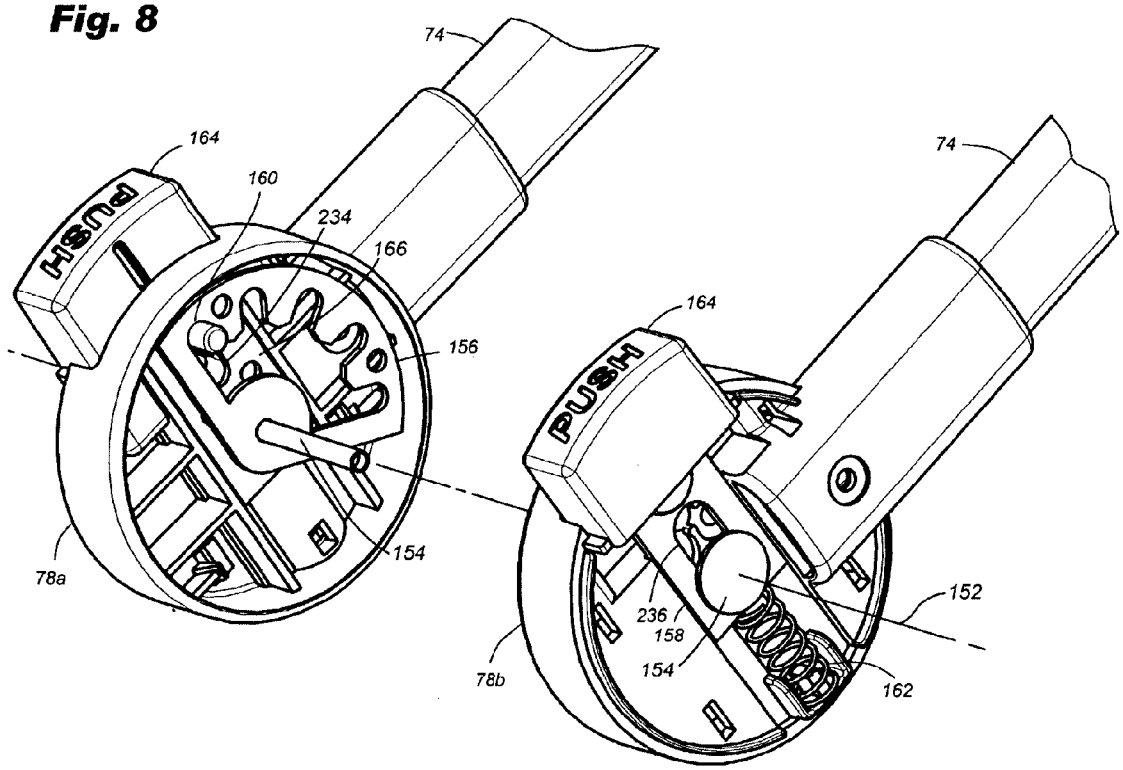

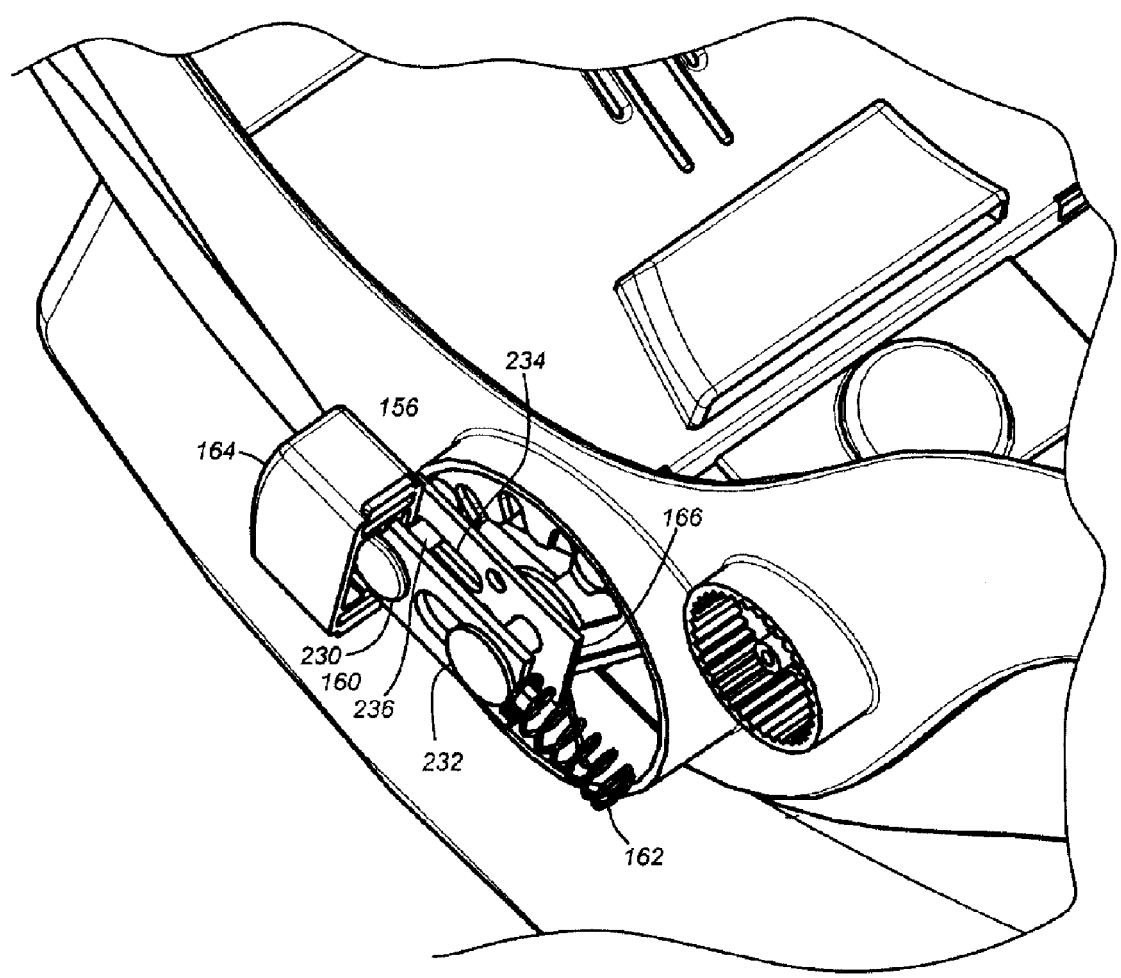

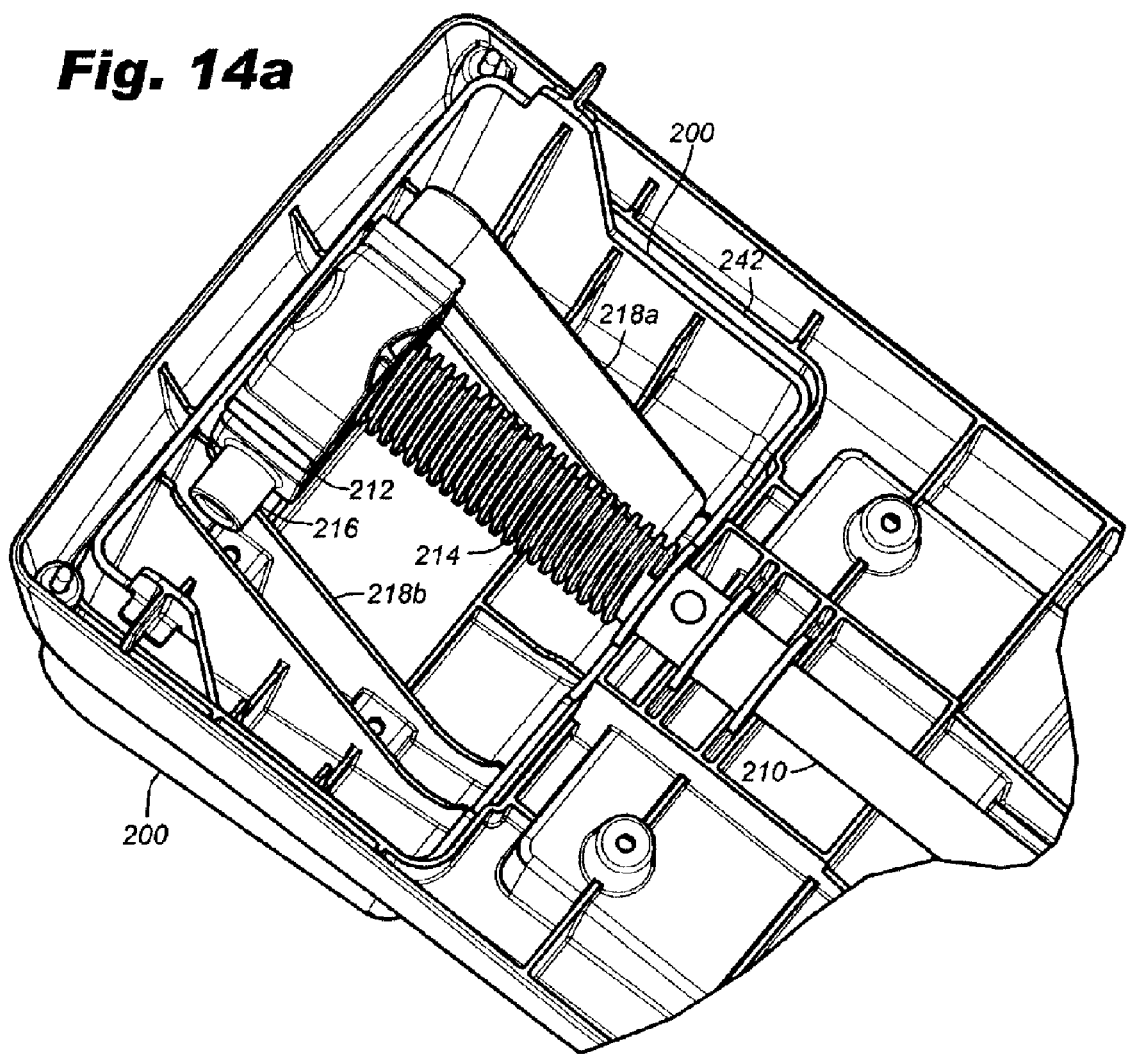

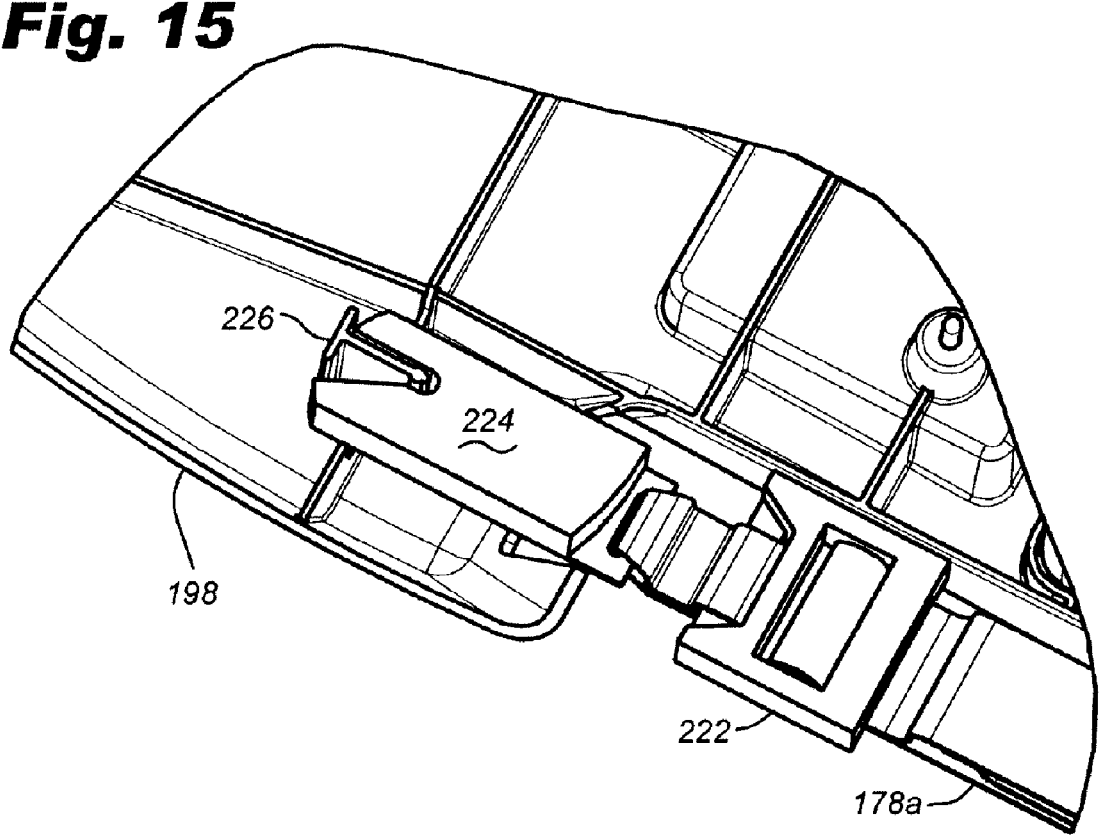

INFANT CARRIER AND RECEIVING BASE

TECHNICAL FIELD

This invention relates to infant carrier and receiving base in combinations as well as individually. The receiving bases employ common latching aspects utilizing releasable securing positioning of the carrier in any number of bases. One specific embodiment is for use as an infant car seat or more precisely, an infant carrier that when combined with a base becomes an infant car seat. Another embodiment is for use as an infant carrier in combination with a carriage stroller.

BACKGROUND OF THE INVENTION

Infant carriers are well-known and used to easily carry an infant from place-to-place as well as seating for an infant for feeding or playing. These carriers are generally a plastic shell with a seating surface, sides, an adjustable carry handle, rocker-shaped bottom runners, a restraint harness, a carry handle and a pad.

Infant carriers are often used as infant car seats either by themselves, or with the addition of a base. If the carriers are used as a car seat by themselves, they have hooks of some kind which can be used to secure them to an automobile seatbelt. If they are used with a base, the base has a somewhat torso-shaped contour over which an automobile seatbelt is passed to secure the base in the automobile. The carrier is then attached to the base in some way.

Infant car seats have progressed over the years. The first infant car seat was little more than a double-walled plastic dish pan (the GM® Loveseat). Evenflo advanced the state-of-the-art with a lightweight infant car seat with an adjustable angle (the Dyn-o-mite™). Century followed with an infant car seat with a carry handle and a stay-in-the-car base (the Century® 580). Other manufacturers have also added improvements as they introduced new models. The various seats have provided good protection in transporting children in automobiles.

Despite the advances, however, infant car seats are not as safe or easy to use as they might be. For example, changing the shoulder belt height on most seats means unthreading a complex belt system and rethreading through a different set of slots, which is a difficult task for people who are not mechanically inclined. Additionally, nearly every infant car seat has been recalled because their handle lock mechanisms were not strong enough and jumped position. It has been reported that misuse of infant car seats continues to be a major problem and current seats are too complex. Finally, most infant car seats require removal of the infant carrier from the base to adjust the infant carrier back angle, which means the user is trying to adjust a back angle that is not currently visible.

This invention was developed to continue to advance the state-of-the-art for infant car seats. It attempts to make an infant car seat that is easier to understand, easier to use, and safer.

SUMMARY OF THE INVENTION

The invention comprises an infant carrier and a mating base which combine to form an infant carrier/car seat combination. The infant carrier can be used by itself as an infant carrier, but it is made to be very lightweight and must be used with its companion base, which is heavier and more structural, to become an infant car seat. This combination infant carrier/car seat combination, like other infant carriers, has a seat, a back and side walls. It also has belt slots which will accommodate a 3-point or a 5-point harness system. It has a carry handle attached to the central upper side walls and a means to adjust the position of the carry handle. It also has either a 3-point harness system which comprises a crotch belt with a buckle and two shoulder belts, or a 5-point harness system which comprises a crotch belt with a buckle and left and right lap/shoulder belts which attach to the crotch belt buckle. It also has a means to adjust the location of the slots in the seatback where the shoulder belts pass through as well as a means to adjust the belt length of the lap/shoulder belts. Further, it has runners on its bottom to allow a rocking motion when the carrier is placed on a flat surface and to mate with a contour in a matching base when the carrier is used with the base. In addition, it has a mechanism to cooperate with the base to removably secure the carrier and the base together.

The base of this invention has an upper contour which matches and receives a portion of the runners on the carrier so as to locate the carrier relative to the base and to help secure it to the base by preventing side-to-side movement and front-to-back movement. The base also has components which cooperate with a mechanism in the carrier to complete removable attachment of the two by preventing vertical movement of the carrier relative to the base. The base also has a bottom contour which rests on an automobile seat and which is adjustable to elevate or lower one end of the base, and thus to control the angle of the base relative to horizontal in a front-to-back direction. The adjustment is achieved by turning a knob on the back of the base, which through a mechanism, adjusts the base bottom contour. The base also has a somewhat torso-like contour near its front to accept at least the lap portion of an automobile seatbelt and which can also accommodate a standard LATCH (Lower Anchors and Tethers for CHildren) belt system, a specialized belt mandated by FMVSS (Federal Motor Vehicle Safety Standard) 225 to attach children's car seats to automobile seats and the corresponding top tethers and lower attachments identified in FMVSS 213. Finally, the base optionally has a lock-off which can squeeze and deform the automobile lap seatbelt and/or lap/shoulder seatbelts thus securing them to the base.

The belt slots in the back of the carrier, through which the shoulder belt portions of the 3-point or 5-point harness pass are moveable up or down on the back of the infant carrier. This movement is achieved by penetrating or cutting away the back of the carrier in any area it would be desirable to have the belts pass through the back of the carrier. The result of this cutting away is two elongated slots, somewhat wider than the shoulder belts and running from the lowest desired position (plus any clearances required) to the highest desired position. A movable panel with left and right belt slots is located behind the carrier seat back and is slidably retained on the carrier back. Left and right belt slots on the panel correspond to the elongated slots in the carrier seatback.

The movable panel is sized so that there is enough extra material above its belt slots and enough extra material below the belt slots so that whatever position the movable panel is in, the elongated slots in the carrier seatback are always covered. The height of the movable panel, and thus of the shoulder belt slots, is controlled by locating the movable panel relative to the elongated slots in the carrier seatback. This is achieved by mounting a spring-biased plunger onto the rear movable panel and letting it penetrate at least one of several locating openings in the carrier seatback. In one specific embodiment of the invention, multiple plungers engage multiple openings. To move the belt slots from one position to another, one must simply pull the plunger to disengage it with the opening in the carrier seatback, move the movable panel to the desired position and release the plunger to allow it to re-engage with a different opening in the carrier seatback.

The carry handle pivots on an axis running across the carrier from side-to-side and is located by a hub projection on each side of the carrier which rotationally engages a mating hub on each corresponding end of the carry handle. Each carry handle hub is equipped with an outwardly spring-biased plunger which is rotationally constrained but which is allowed to slide normal to the plane of the carry handle, and each plunger is equipped with a projecting pin which extends into its corresponding carrier hub. Each carrier hub has a segment of a gear with inwardly-facing teeth such that the pins on the carry handle plungers can engage with a space between two teeth on corresponding gear segments. When the pins on the spring-biased plungers are in their normal position, carry handle rotation is prevented. When the spring-biased plungers are pushed in, the projecting pins clear their neighboring gear teeth in the carrier hubs and the handle is free to rotate. When the spring-biased plungers are released, the projecting pins again, engage the gear teeth.

A problem with many handle positioning mechanisms as currently manufactured is that they are usually made of plastic which can deform and allow the pin and gear teeth to jump position. A further disadvantage of plastic in current construction is that to achieve strength, the plastic gear segment and the plunger must be thick. Since they are thick, they do not lie coplanar or even nearly coplanar and thus must resist twisting forces on themselves as well as rotational forces on the handle. This invention substitutes a more rigid material such as steel or aluminum for the gear teeth in the carrier hubs. While it is not absolutely essential that steel or aluminum be substituted for plastic, it is important that the gear teeth and mating control mechanisms are made thin and nearly planar.

A second problem of current designs is, as noted above, that the plunger and its pin which engages the gear teeth tends to twist sideways when a rotational force is applied to the carrier handle, because the plunger with its pin and the gear segment on the carrier hub cannot lie in the same plane. In this invention, an additional steel or aluminum guiding plate is fixed to the inside of each carry handle hub between the corresponding plunger in the carry handle hub and the gear teeth in the corresponding carrier hub. The guiding plate has an elongated opening through which the pin of the plunger projects. The elongated opening is sized to allow movement of the plunger and its projecting pin from their maximum outward position where the pin engages its corresponding gear segment to its maximum inward position where the pin is clear of its corresponding gear segment and the handle may rotate. Since the guiding plate is very close to its corresponding gear segment, most twisting of the plungers is eliminated and a more robust and reliable mechanism is achieved.

The base of the infant carrier/car seat has an upper contour to match and receive a portion of the runners on the carrier. The contour locates the carrier shell front-to-back and side-to-side. The base also has at least two steel blades projecting from its surface in a relatively central front-to-back location and located side-to-side to penetrate openings in the runners of the carrier. Each of these blades has a slanted top edge and a recess or hook on its trailing edge. The runners on the carrier each have an opening to receive a corresponding blade. When the carrier is located on the base, the blades project into the carrier. A steel bar located in the carrier in the area of the hooks and extending from one side of the carrier to the other and well past the sides of the blades is spring-biased into the hooks on each respective blade. It can be seen that when the steel bar inside the carrier is engaged in the hooks penetrating the carrier, the two are fastened securely together. The steel bar is loosely connected to a puller near each of its ends and that puller is connected to a common sliding handle on the outside of the carrier. Pulling the sliding handle on the outside of the carrier pulls the pullers which, in turn, pull the steel bar, overcome the spring bias, and move the steel bar free of the hooks in the blades extending from the base. The carrier can then be removed from the base.

If the carrier is set into the base, it is guided into position by the mating contours of the runners and the upper base surface. As the carrier moves downward, the steel blades penetrate the carrier runners, and the slanted upper surface of the steel blades move the steel bar rearward overcoming the spring bias until the carrier is fully seated in the base. When the carrier is fully seated, the hooks in the steel blade align with the steel bar and the spring bias moves the steel bar into a latched position, again locking the carrier and the base together.

The bottom contour of the base is divided into two portions, a fixed portion in the rear and a movable portion in the front. The movable portion is telescopically mounted near the front of the base and can move into or out of the base thus changing the base angle relative to the seating angle. The moving portion of the base telescopes into the base at its front from an extended position to a position nearly flat to the fixed portion of the base.

When the base is on an automobile seat, the base recline angle can be controlled by controlling the position of the telescoping moving base. The first element of the position controlling mechanism is an axle extending from near the front of the base to beyond the rear of the base. A knob is fixed to the rear of the axle to allow turning of the axle, and a screw thread is fixed to the opposite end. A moving nut or follower is engaged on the screw thread such that it cannot rotate but must move forward or backward as the axle is turned with the knob. The follower has two lateral cylindrical projections extending from each side, each projection in contact with an inclined plane attached to the telescoping moving base. Therefore, longitudinal front-to-back axial movement is translated into vertical movement by impingement of the cylindrical projections of the cam follower on the inclined plane of the moving base which drives the moving base into or out of the base. The advantages of this system are its infinite adjustment and its accessibility even when the carrier is on the base.

The base of the infant carrier/car seat combination has a torso-like path for the automobile seat belt or LATCH belt. On most carrier bases, there is no further connection between the base and the automobile or LATCH belt. This base is provided with a lock-off located in the belt path to more firmly secure the automobile seat belt to the base and help prevent any sideward relative sliding between the base and the automobile seat belt. The lock-off further aids in securing the base when the automobile lap/shoulder belt has a free-sliding latch plate and an emergency locking shoulder belt by clamping the lap and shoulder belts together and minimizing potential movement between them. The lock-off includes a transverse groove in the base in the central part of the belt path. A raised rib with a knurl is positioned in the center of the transverse groove. A hollow channel lock-off beam is pivotally attached to base at one end of the transverse groove through apertured openings in the beam channel through which is inserted a pivot pin captured within a pivot housing. Movement of the beam is pivotal from an open position to a closed position where it is essentially parallel to the transverse groove.

The lock-off beam can be secured in the second, essentially parallel position by any of several means, the preferable being a spring-loaded plunger on its free end whereby the spring-loaded plunger has a protruding lip which can engage a similar reversed lip in the base. The lock-off beam is provided with left and right extending walls which fall in the transverse groove in the base on either side of the knurled rib in the transverse groove. When the automobile seat belt (or seat belt and combined shoulder belt) are captured between the transverse groove and the extending walls of the lock-off beam, they are forced into a "W" form and pushed into the knurled rib thus greatly diminishing the ability of the seat belt(s) to move relative to the base.

A mounting and storage component is provided for the LATCH belts when required to be supplied with infant car seats. This solves the LATCH belt storage problem by making pockets on either side of the base adjacent to the belt path. The pockets have securing sockets and the LATCH belt ends are secured into these sockets. When the LATCH belt ends are stored, the belt path is entirely free to use a standard automobile seatbelt.

It is an object of this invention wherein the mechanism controlling the handle angle uses an intermediate plate with an elongated slot to greatly increase handle strength and reliability.

It is another object of this invention wherein the method of adjusting the shoulder belt height uses an external moving panel which is intuitive, simple and requires no rethreading of belts and no hard components in the infant seating area.

It is still another object of this invention wherein the infant seat to base attachment uses a simple, reliable and strong two or more point attachment combined with a locating "bucket."

It is still yet another object of this invention to provide a means of achieving angular adjustments of the base wherein the adjustment means is accessible when the infant car seat is installed in an automobile with the infant seat installed on the base.

It is a further object of this invention to provide child harness belts which are easily removable.

In comparison to Prior Art devices which use a plunger and teeth arrangement to control the handle angle, most of which have not been strong enough and have been recalled, none uses metal-to-metal engagement, and none use an intermediate plate to reduce twisting of the locking plunger.

Wherein most infant carriers use simple slots which require belt rethreading to change the belt position, and others use elongated slots with sliding plates, none uses an external sliding panel secured to the exterior of the infant carrier which is easy to use and has no component on or near the seating surface.

Wherein many infant carriers use a rear release handle on the carrier or base in which to attach infant seats to bases, and while most have mating hooks and latches of some sort, none have at least a pair of notched metal plates protruding from a recessed locating bucket which are engaged by a metal axle and whereby the axle is released from the notched metal plates by a release handle mounted to the exterior of the infant carrier such that the natural motion of picking up the infant carrier is compatible with and encourages the movement required to release the infant carrier from the base.

Wherein other manufacturers use multiple methods to achieve angular adjustment, and wherein for example, Graco uses a pivoting front base with an inconvenient latching means which is not accessible when the base is installed and is limited to three positions, and whereas Evenflo uses a screw adjustment which is flimsy and not accessible with the seat installed, and further wherein others use flipper panels which are limited to two positions and require removal of the base to adjust, none of these methods offers the convenience afforded by an externally driven adjustable front foot of the present invention.

And wherein others have harnesses that are removable for washing for example, none is removable by simply folding out two belt retainers as shown and illustrated on the present invention.

The invention as described below is different from the above devices in at least the following aspects: (a) the metal-to-metal mechanism with an intermediate plate is stronger and very reliable; (b) the rear-mounted belt height adjuster panel is very easy to understand and use, others are not; (c) the rear, centrally mounted belt height adjuster is operated entirely from the rear of the seat and the means of operation is compatible with and encourages the intended result; (d) the base angle adjustment is infinite and accessible when both the base and the infant seat are installed in an automobile and does not require removal of the auto seat belt or LATCH belt to allow adjustment; and (d) the harness retention system is simple and easy-to-understand and thus is less likely to be used incorrectly.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 3 is a bottom rear perspective of the infant carrier of FIG. 2,

FIG. 8 is an enlarged view of the handle hubs of the infant carrier with hub covers removed on each hub;

FIG. 8*a* is an enlarged partial fragmentary assembly view of the handle hubs with outer handle hub housing removed;

FIG. 14a is an exploded fragmentary assembly view of the base with its top removed and one inclined plane removed illustrating one cylindrical projection of the cam follower used to effect vertical movement of the movable portion of the base which is visible;

FIG. 15 is a bottom partial fragmentary view of one of the base LATCH belt storage and securing compartments.

DETAILED DESCRIPTION OF THE INVENTION

Figure 1:
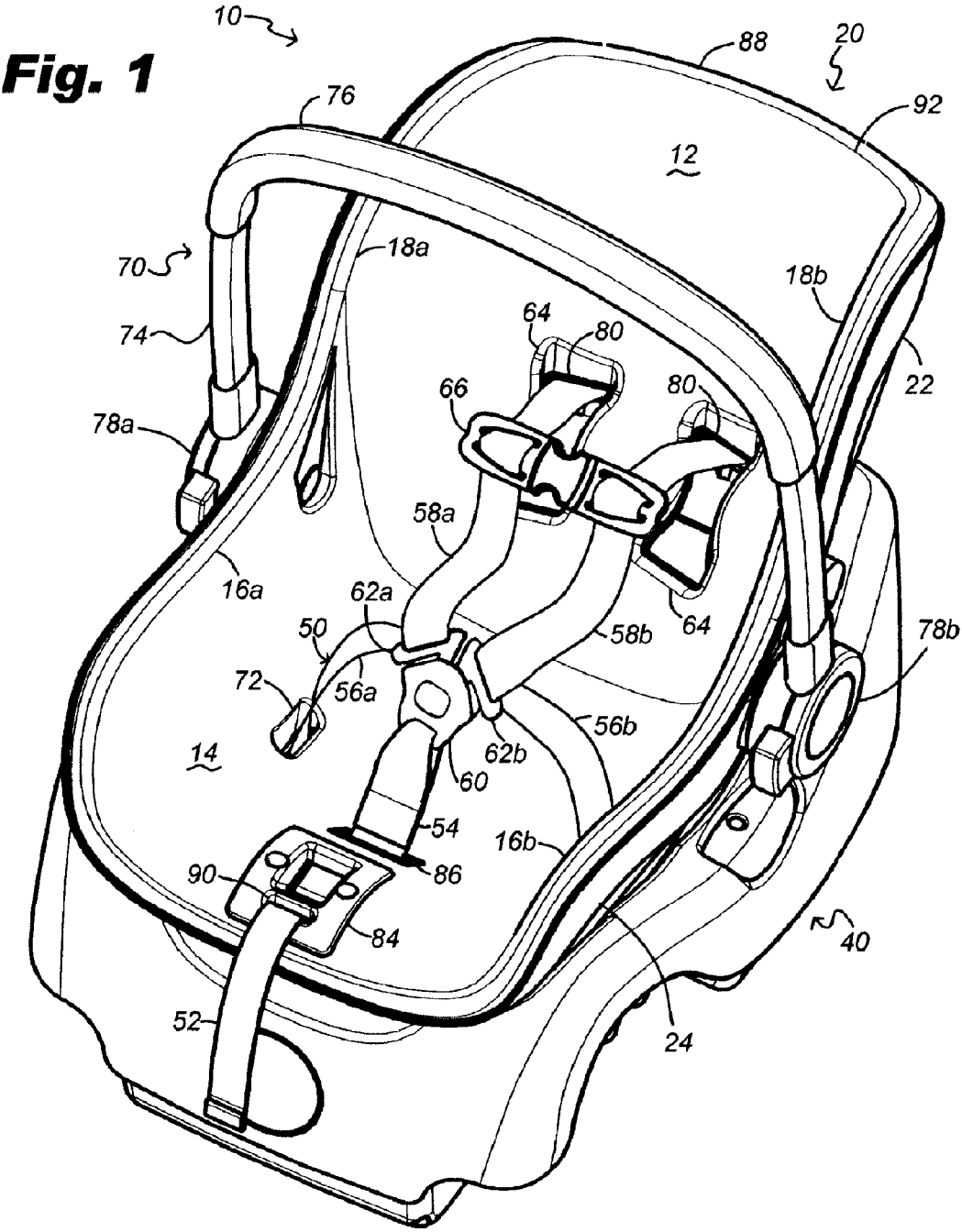
FIG. 1 is a front perspective view of the infant carrier positioned in its base for use as an infant car seat.

Referring now to the drawings wherein the drawings are for purposes of illustrating the preferred embodiment of the invention only and not for purposes of limiting the same, the figures show a separable infant carrier/car seat combination. The infant carrier may be used alone to carry or seat an infant, or in combination with a base to transport an infant in an automobile. The infant car seat has two main components; an infant carrier and a base into which the infant carrier fits and is removably secured. The base consists of a platform with a seat receiving contour which at least partially mates with the bottom of the infant seat, a set of automobile seatbelt receiving openings on its left and right sides, and a bottom panel, part of which is fixed, and part of which is movable by an angle adjusting means to adjust the angle of the base when it is positioned on an automobile seat. Further, the base cooperates with the removable securement means of the infant carrier to allow the infant carrier to be either attached or released from the base.

Figure 2:
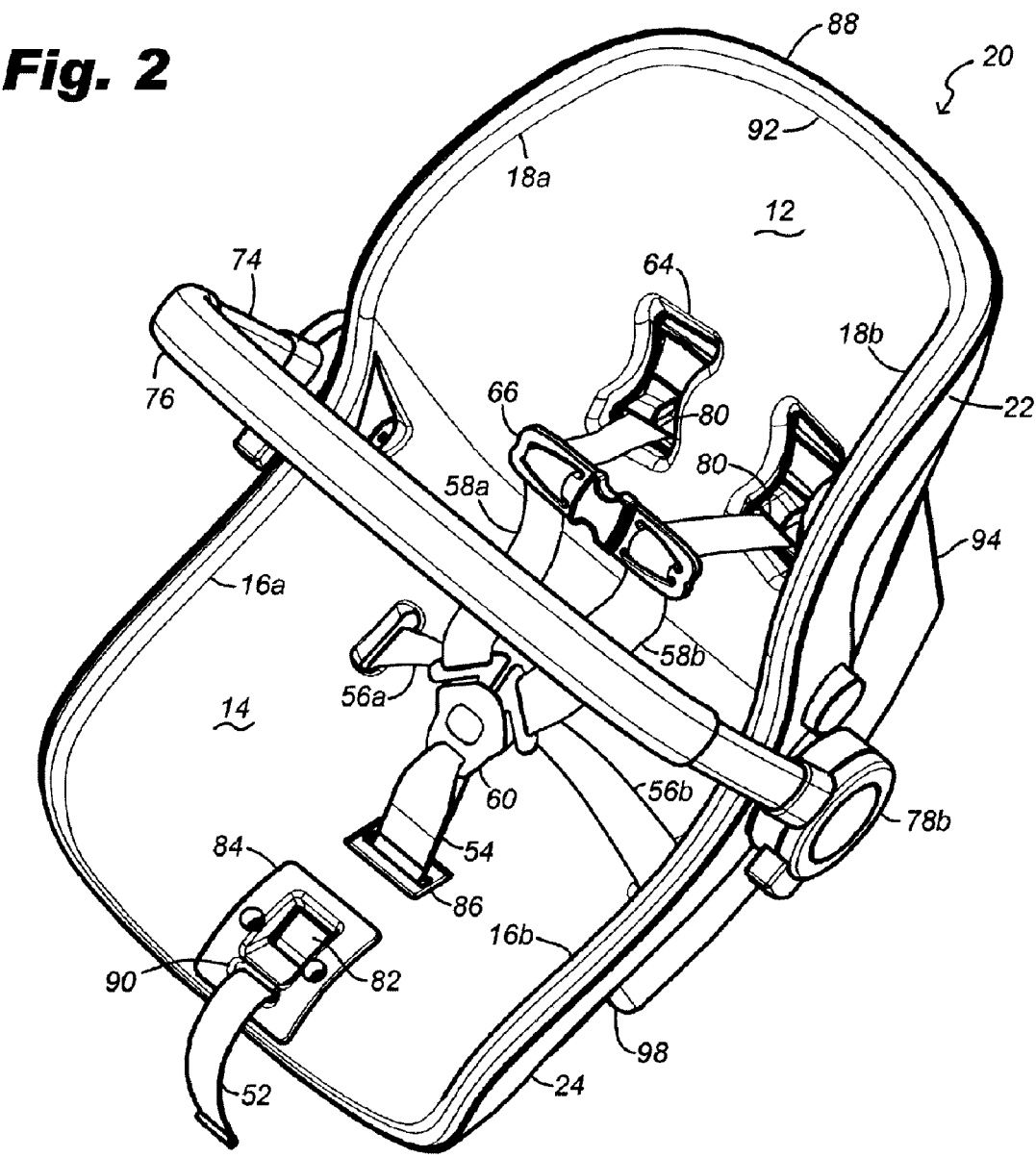
FIG. 2 is a top perspective view of the infant carrier of FIG. 1 removed from its base for use as an infant carrier.

The infant carrier/car seat combination 10 has a removable infant carrier component 20 with adjustable carrying means 70 and child restraining means 50 in combination with a releasably mating receiving base 40 for securing the carrier component therein. FIG. 1 illustrates infant carrier/car seat 10 in combination with child restraining means 50 (interchangeably referred to as a restraint harness) positioned in its upper position through its threading engagement with belt height positioning means 80 while FIG. 2 illustrates the infant carrier removed from receiving base 40 and the child restraint harness illustrated in its lowered position. As shown in those figures, removable infant carrier 20 has an outer plastic shell 88 with an upper plastic seat back region 22 and lower plastic seat region 24. This outer plastic shell is optionally at least partially lined with a foam inner liner 92 having a bottom seating surface 14 with left 16a and right 16b curvilinear foam carrier seat raised sides, and a back surface 12 with left 18a and right 18b curvilinear foam carrier back side panels, the designation left and right being determined from the perspective of a viewer looking toward the infant carrier/car seat base with its seating surface in closest proximity to the viewer. The infant seat is formed of a molded plastic shell lined with an expanded polystyrene foam liner, much like a helmet. The plastic shell and expanded foam are secured to each other by mechanical means or an adhesive or combinations thereof, so that they act cooperatively to produce a more rigid structure.

The outer contour of molded foam inner liner 92 at least partially approximates the inner contour of outer plastic shell 88 and has a thickness so that its inner contour becomes the inner seating surface, back surface, and sides of the infant carrier. The foam liner serves to attenuate impact forces, reduce the likelihood of penetration of the shell, and provide a more contiguous seating surface than the molded seat shell. Foam densities and energy absorbing properties can be varied by the particular foam material and formulation selected.

Infant carrier 20 also has an adjustable carrying means 70 which includes carry handle 74 pivotable about right 78b and left 78a hubs with optional foam covering 76 affixed about at least a portion of the handle. Child restraining means 50 includes a harness system including buckle 60, seatbelt webbing (variously 54, 56a, 56b, 58a, 58b), means to adjust the shoulder belt height 100 for various sized infants through hour-glass slots 64 in the foam inner liner 92 as well as corresponding hour-glass slots 34 in outer plastic shell 88, and means to adjust the harness length 82 for various sized infants. Securing engagement of one end of the child seatbelt webbing includes means to fasten buckle 60 in the infant carrier through slotted buckle web opening 86 using crotch strap 54 as well as child lap belt webbing retaining means through side seat slotted openings 72 for the left 56a and right 56b child lap belts. FIG. 1 and FIG. 2 illustrate a five-point harness system consisting of crotch strap 54 in conjunction with child shoulder belts 58a, 58b which are contiguous with child lap belts 56a, 56b by threading through apertured buckle inserts 62a, 62b respectively. In a three-point harness system, the child lap belts are not present. Slotted child shoulder belt positioning means 66 is optionally threadably engaged with left 58a and right 58b child shoulder belts. Belt length adjustment means 84 is positioned toward a front center of the carrier with trim bezel 82 and slotted opening 90 for length adjustment web 52 which through its interconnectivity with the other child restraint belts in the rear of the carrier will simultaneously adjust the fit of these belts as well.

As better illustrated in FIG. 2 and FIG. 3, illustrating infant carrier 20 removed from its receiving base 40, the infant carrier has generally curved arcuate runners 96 with front 98 and back 94 walls. The curved runners optionally have at least one raised rubber runner 102 (better illustrated in FIG. 3) positioned at least along a portion of each curved runner 96, the raised rubber runners on the curved segment of runners 96 softening noise and preventing sliding which would otherwise be created when rocking infant carrier 20 when removed from receiving base 40. Raised rubber runners 102 on infant carrier 20 are similar to rocking runners common to most infant carriers and are inserted into the shell and formed into an arc underneath the back and seating surfaces. They are spaced apart to allow the molded seat shell center bottom contour to assume an independent shape.

Figure 5:
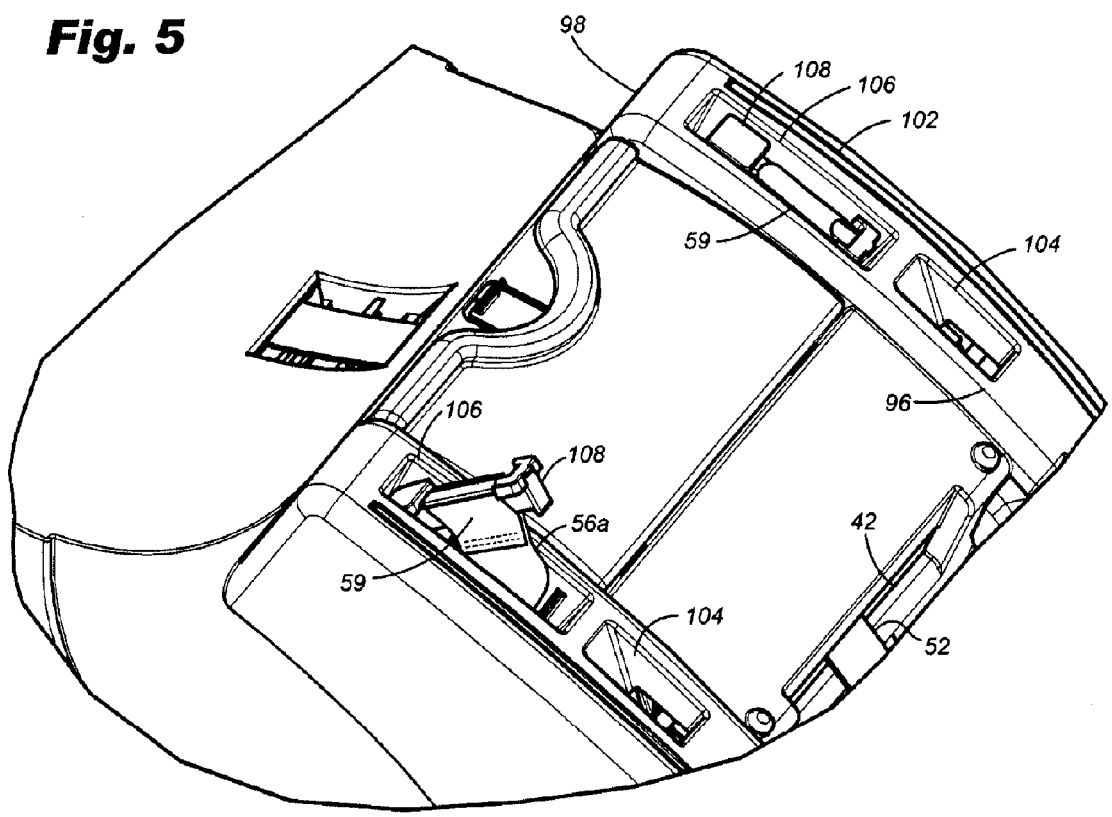
FIG. 5 is a partial bottom view of the belt retention means.

Curved runners 96 have at least one pair of bottom apertures 104 for releasable engagement of a pair of upwardly-extending rearward-facing hooks 128 as described subsequently for releasably securing infant carrier 20 into receiving base 40. Optionally, a second pair of bottom openings 106 as better shown in FIG. 5, are present toward the front of curved runners 96 for pivotally securing engagement of left 56a and right 56b child lap belt webbing via anchor clips 108.

Angled back panel 120 of infant carrier is generally recessed at an angle to back walls 94 and further includes rear slot 42 for threading of length adjustment web 52 into clip 112 in threaded communication with left 58a and right 58b child restraint shoulder webbing passing through slightly angled slotted openings 116 in child restraint webbing height adjustment means 100. In a manner to be more fully described in this application, belt height adjustment means 100 is slidably repositionable through cooperation with height adjustment knob 114 through engagement with angled back panel 120. Toward the top of rear outer plastic shell 88 is recess 118 for releasing the locking engagement of infant carrier 20 from receiving base 40 by upward movement in a manner subsequently described.

Figure 3A:
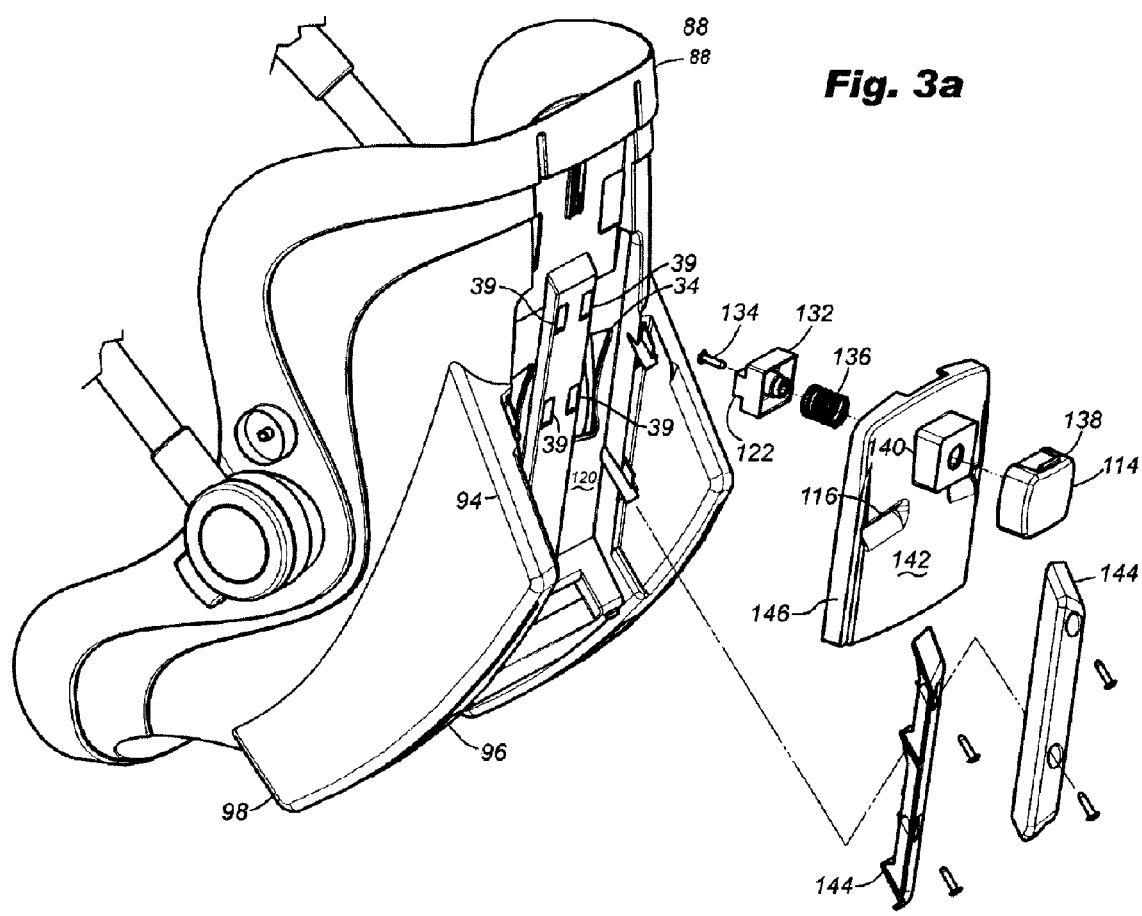
FIG. 3*a* is an exploded view of the belt height adjustment panel in its upper position illustrated in FIG. 3.
Figure 3B:
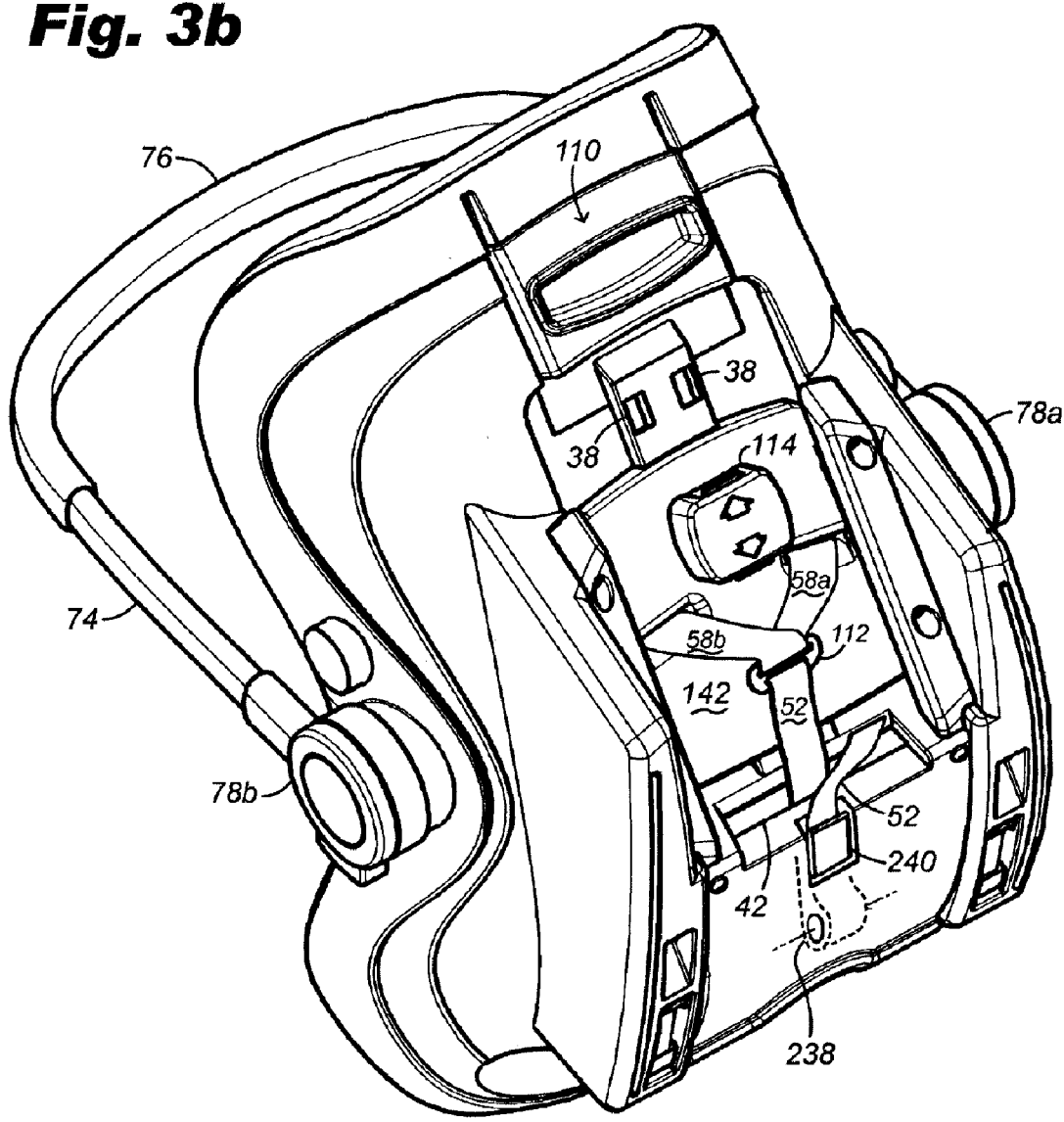
FIG. 3*b* is a bottom rear perspective view of an alternative embodiment of the infant carrier of FIG. 2 illustrating rear belt length adjustment and also showing the belt height adjustment panel in its lower position.
Figure 4:
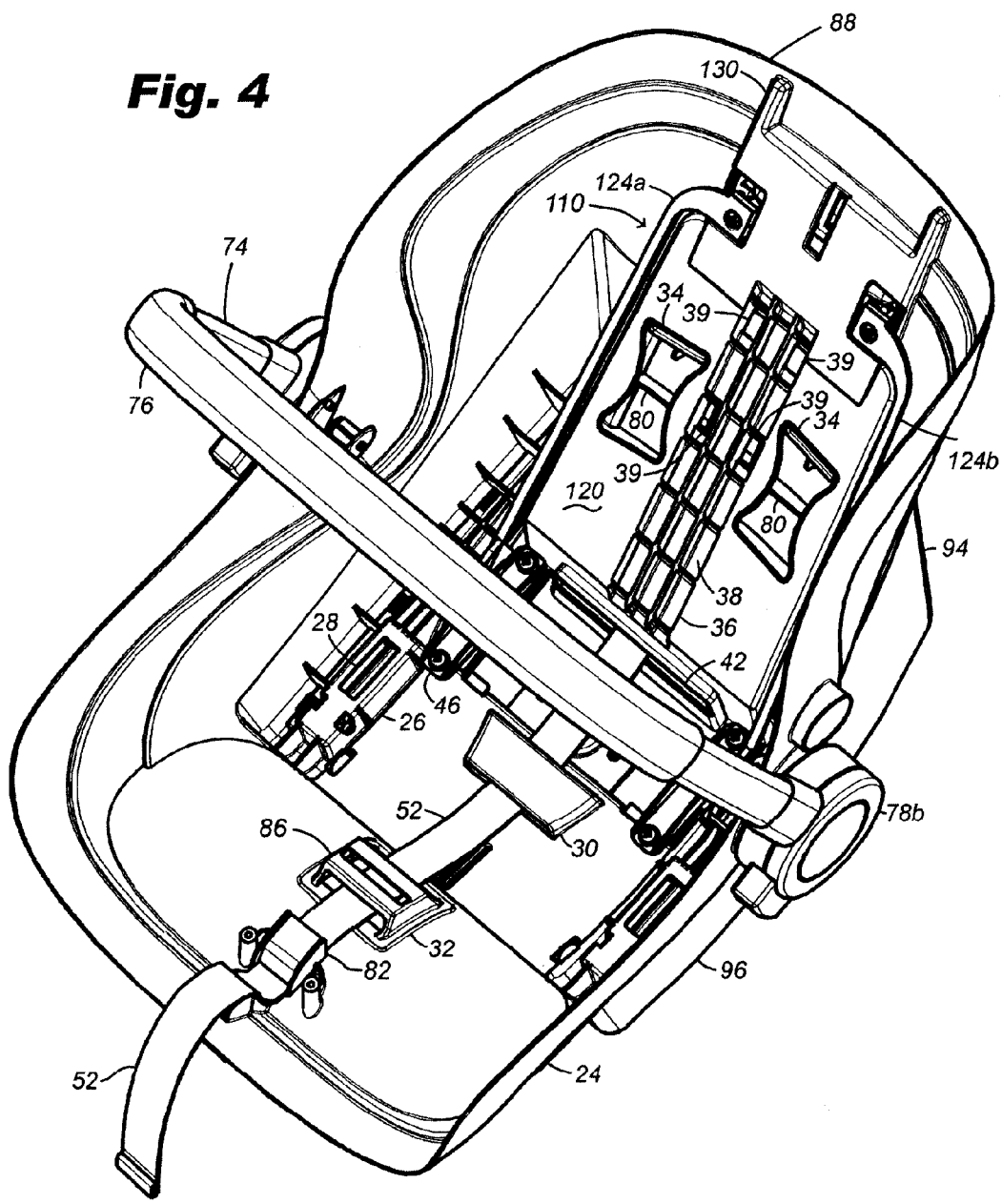
FIG. 4 is a top perspective view of the interior of the plastic shell of the infant carrier of FIG. 2 with its foam liner and adjuster bezel removed.

FIG. 4 illustrates the interior of outer plastic shell 88 with foam inner liner 92 removed and better illustrates the belt path of length adjustment web 52 after passing through slotted opening 90 in trim bezel 84 (which would be positioned on top of the foam inner liner 92). Length adjustment web 52 passes through apertured plastic guide 32 as well as through slotted seat floor guide 30 for egress through rear slot 42 in angled back panel 120 and into secured engagement with clip 112 better illustrated in FIG. 3. Depressing belt adjustment means 82 permits disengagement thereof with resulting lengthening of length adjustment web 52 and its corresponding lengthening of child shoulder belts 58a and 58b through their interconnectivity with clip 112. Tighter engagement is achieved by the application of an outward force to the end of length adjustment web 52 without the need for depression of belt adjustment means 82 (or equivalently release tab). Alternatively, as illustrated in FIG. 3b, belt length adjustment may be positioned at the rear of the carrier when rear harness adjustment means 240 is positioned at any applicable location on the rear of outer plastic shell 88 or adjustment panel rear surface 142.

Left 56a and right 56b child lap belts are securely engaged into infant carrier 20 in curved runners 96 by anchor clip 108 pivotably secured in second pair of bottom apertures 106 (better illustrated in FIG. 3). Securing engagement is effected into the interior of the carrier base by bracket 26 with slot 28 (better illustrated in FIG. 4) providing the pathway for the belt web to pass through side seat slotted child lap belt openings 72 in foam inner liner 92 illustrated in FIG. 2 for connection via either buckle insert 62a or 62b into buckle 60.

Figure 6:
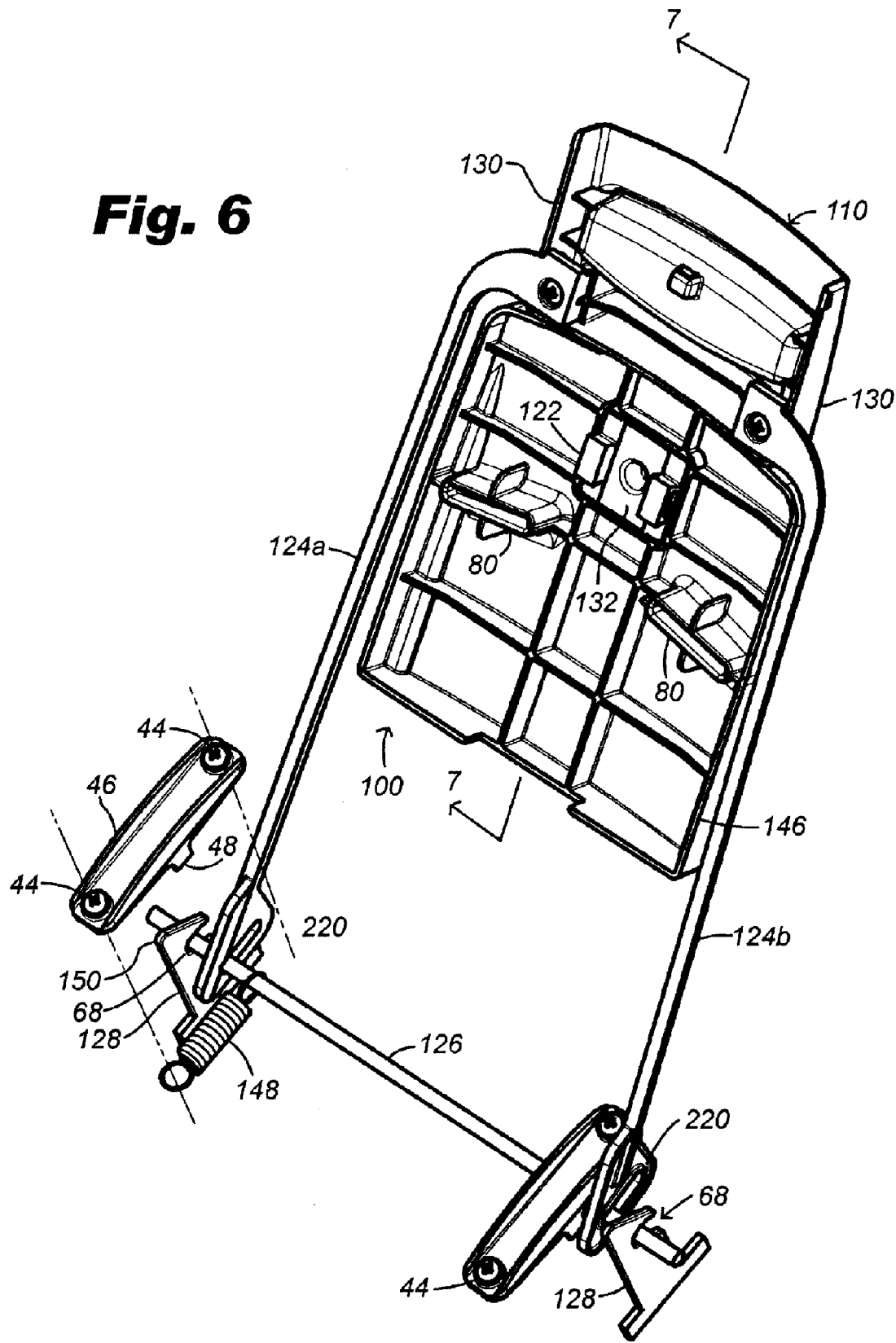
FIG. 6 is an assembly view of the infant carrier release mechanism and the infant shoulder belt adjustment mechanism.
Figure 7:
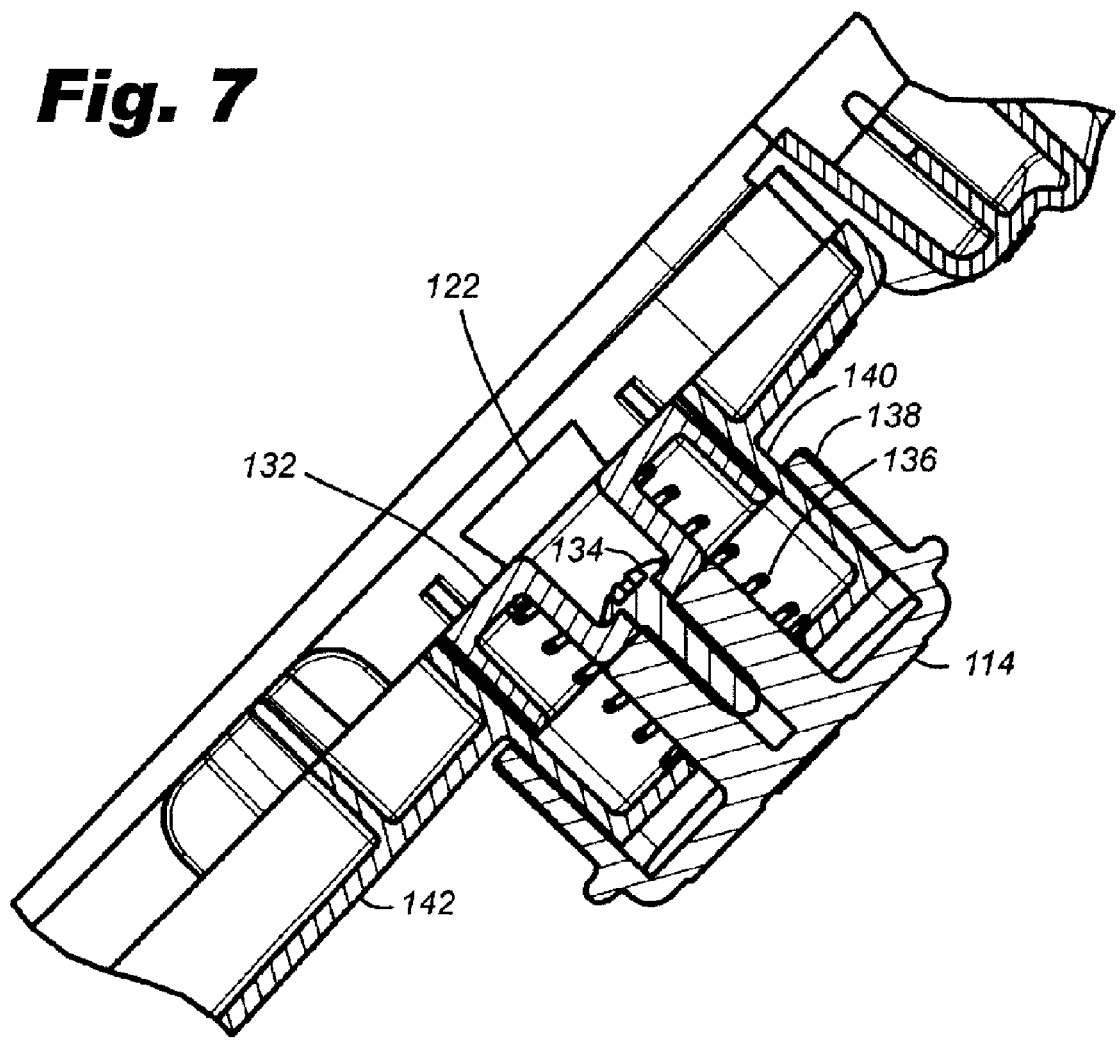
FIG. 7 is an enlarged cross-sectional view of a portion of the shoulder belt adjustment mechanism taken along line 7-7 of FIG. 6.

The interior side of angled panel 120 has a grid matrix 36 with recesses 38, at least two recesses 38 are open through outer plastic shell 88, although preferably at least four through holes 39 will be present as illustrated in FIG. 3a) dimensioned for mating engagement with projections 122 on an interior side of belt height adjustment means 100 through sliding movement of height adjustment knob 114, the projections penetrating into at least one, preferably two or more holes 39 in grid matrix 36 in angled back panel 120. As better illustrated in FIG. 3a and FIG. 6, upward and downward movement of height adjusting means 100 is achieved by overcoming the inward biasing force of spring 136 and the simultaneous application of up or down force by a user with height adjustment knob 114 and engagement block 132 with projections 122 through interconnection via recessed screw attachment 134. A pair of overlapping securing guides 144 (FIG. 3) are positioned at each lateral extremity of belt height adjustment means 100, the securing guides configured to permit up and down movement of adjustment means 100 in a channel created between securing guides 144 and the rear surface of outer plastic shell 88, the channel depth approximating the thickness 146 of belt height adjustment means 100. Underlying the two hourglass slots 64 in foam inner liner 92 and corresponding hourglass slots 34 in outer plastic shell 88 are two preferably racetrack-shaped slightly inwardly-penetrating and preferably angled belt height positioning means 80 (e.g., slots) which guide and position left 58a and right 58b child shoulder belts. The inward penetration of height positioning means 80 is essentially the same as the thickness of the height adjustment panel or less and is better illustrated in FIG. 6.

Releasable securing engagement of the infant carrier into the receiving base for use as a car seat is achieved by release mechanism means 110. The mechanism has a recess 118 which is dimensioned to accept at least one (preferably more) fingers of a user when providing an upward force on the mechanism. Extending downwardly and secured to the rear of release mechanism means 110 are a pair of left 124a and right 124b arms, (although only one connector is required) each of which preferably terminate in angled slotted openings 220 at a base thereof, the angle measured with respect to the longitudinal axis of arms 124a and 124b, the opening dimensioned to preferably accept a cylindrical rod 126 positioned there between. Slotted openings 220, which may preferably be racetrack-shaped, defines a pathway within which the rod may move in conjunction with supports 46 which extend above the floor of outer plastic housing 88 by pedestal supports 48 and are secured at each end by fastening means 44 such as screws. In the embodiment illustrated in FIG. 6, rod 126 is biased toward a front of the carrier by rod biasing means 148, e.g., a spring secured about rod 126 at one end and into the forward fastening means 44 at its opposed end. It is understood by those skilled in the art that the orientation and mechanism of operation of the releasable securing engagement could be reversed using simple engineering principles.

Securing engagement is effected by positioning carrier bottom openings 104 above upwardly-extending rearward-facing hooks 128 affixed to receiving base 40 and allowing penetration of the same into the openings. Upon impingement of rod 126 upon the top of declined surface 150, the rod will move along the declined surface as well as within the preferred racetrack openings 220 and the gap between pedestal base 48 and rear fastening means 44. Upon reaching the end of the declined surface, rod 126 will return to its originally biased forward position and seat against the back of slot 68 in upwardly-extending rearward-facing hook 128. Removal of the carrier from its base involves a reversal of many of the previous steps, and requires upward movement of release mechanism means 110 overcoming the inherent biasing of rod biasing means 148 through the translation of vertical movement into horizontal rearward movement by the cooperation of preferred racetrack opening 220 pulling the rod rearward and thus concomitantly moving rod 126 to the tip of slot 68 in hook 128, thereby allowing removal of the carrier with resulting return of rod 126 to its original spring-biased position with return of the release mechanism to its original position. Once again, it is understood by those skilled in the art that the rearward-facing hooks could be reversed using simple engineering principles. Preferably hooks 128 and rod 126 are metal, although reinforced plastic is also capable of being used.

Figure 9:
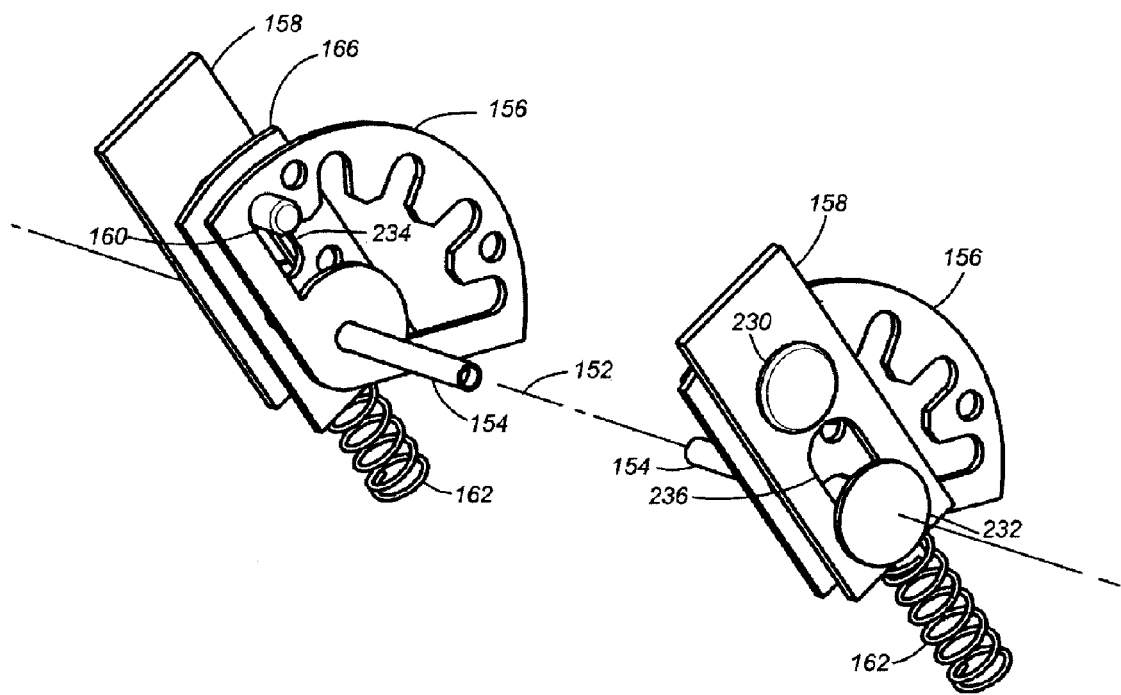
FIG. 9 is an assembly view of the gear segment mechanism of the hubs of FIG. 8.

Infant carrier 20 has a carrying handle 74 which straddles the carrier. Each leg of the handle is affixed to hubs on the exterior sides of outer plastic shell 88. The handle is pivotable about an axis for repositioning of the handle between a carrying position as illustrated in FIG. 1 through FIG. 4 and at least one reclined position as illustrated better in FIG. 14c. As illustrated in FIG. 8, FIG. 8a and FIG. 9, outer plastic shell 88 has a molded hub 78a and 78b integrally attached on either side with handle axis 152 having an aligned axis passing there between. These handle hubs are pivotally secured to outer plastic shell 88 on this axis optionally using a fastening means 154, e.g., a rivet, screw, etc., such that they can rotate to a more-or-less vertical position, a position beyond horizontal to the rear, or any of several other selectable positions between.

A series of teeth or gear segments 156, preferably stamped of metal, but alternatively of strong plastic is secured to or molded into the inside of the hubs on the plastic outer shell. A sliding plate 158 with laterally protruding pin 160 optionally having a protruding pin head 230 secured to the sliding plate preferably by welding such that sliding plate and protruding pin 160 move together in a sliding manner toward or away from the axis 152 of the hub. The protruding pin moves within elongated slot 234 and employs biasing means 162, e.g., spring, to bias sliding plate 158 away from the hub. Protruding pin 160 is so positioned that it engages gear segment 156 mounted to the shell hub when it is in its outward position as achieved by the spring bias. When protruding pin 160 is engaged in gear segment 156, rotation of handle 74 is fixed relative to outer plastic shell 88.

An extension of sliding plate 158 penetrates the outer surface of carry handle hubs 78a and 78b and is crowned by plastic push button 164. Upon depression of push button 164, sliding plate 158 overcomes the outward bias of biasing means 162 and disengages protruding pin 160 from gear segment 156. Carry handle 74 rotation relative to plastic shell 88 may then be adjusted. Releasing push button 164 allows biasing means 162 to re-engage protruding pin 160 with gear segment 156 thus re-securing carry handle 74 rotation relative to outer plastic shell 88. The strength of the handle locking means described above is dependent on at least the strength of the materials selected, the distance of the gear segment from the axis, and the geometry of the gear segment. It is also dependent on the proximity of the sliding plate from the gear segment since at greater distances, protruding pin 160 and sliding plate 158 will tend to twist on the sliding axis. To decrease the tendency of the sliding plate and extending pin to twist on the sliding axis, fixed guide plate 166 is mounted to the inside of the handle hub, sandwiched between gear segment 156 and sliding plate 158. Fixed guide plate 166 has an elongated slot 234 which allows extending pin 160 to travel inward and outward from the pivot axis, but lessens its tendency to twist about the sliding axis by the presence of elongated slot 234 which permits sliding movement of protruding pin 160 through fixed guide plate 166 as best illustrated in FIG. 8a. The movement of protruding pin 160 is fixed in sliding plate 158 while axle 152 is permitted to move within elongated slot 236 while correspondingly, protruding pin 160 is permitted to move within guide plate 166 while axle 152 is fixed. Elongated slot 234 resists any tendency of protruding pin 160 to twist. Preferably, both sliding plate 158 and fixed guide plate 166 are made of metal, although once again, reinforced plastic may also be used.

As discussed previously, but now in the context of more fully describing the belt pathways, the seatbelt system consists of a three or five-point harness, consisting of a central buckle 60 from which radiate either: two child shoulder belts (58a and 58b) and a crotch strap (54); or two child shoulder belts (58a and 58b), two child lap belts (56a and 56b), and a crotch strap (54). In either case, the shoulder belts pass through hourglass slots 64 in foam inner liner 92 as well as corresponding hourglass slots 34 in plastic outer shell 88 and join either permanently or removably to single length adjustment belt 52 by clip 112. In the preferred embodiment, length adjustment belt 52 has a sewn loop about one slot in clip 112. Left 58a and right 58b child shoulder belts preferably pass through a second slot in clip 112, each returning to the front of the car seat by passing through left and right child shoulder belt slots. In the case of a five-point harness, the two shoulder belts pass through the left 62a and right 62b buckle inserts and become the left 56a and right 56b child lap belts. These lap belt portions of the harness pass through bottom seat surface of seat portion 14 of foam inner liner 92 and slots 28 in outer plastic shell 88 and are secured by belt anchor clips 108 in second pair of openings 106 for engagement with slotted brackets 26 in outer plastic shell 88.

As better illustrated in FIG. 5, left and right lap belt anchor clips 108 pivot on a belt anchor axis positioned on one side of the anchor from a position relatively flush with the bottom surface of outer plastic shell 88 to a position protruding from the shell. When the left and right belt anchor clips are in their protruding position, terminating loops 59 of left 56a and right 56b lap belts may pass through slots 28 in slotted brackets 26 in outer plastic shell 88 and be placed over the length of belt anchor clips 108. When the belt anchor clips are again folded to their flush position, the lap belts are secured, they can neither come off of the belt anchor clips, nor can they pass back through the molded shell. This arrangement allows for a single piece lap/shoulder belt which forms both the left and right sides. Anchoring the ends is easy and semi-permanent. The belts can be easily removed for cleaning, but in normal usage are secure.

Length adjustment belt 52 is secured at one end to clip 112 and passes through rear slot 42 in the back of outer plastic shell 88 into a void between the shell and foam inner liner 92. This adjustment belt continues toward the front of the carrier between the molded seat shell and the foam inner liner until it meets and is adjustably secured by harness length adjustment means 82 mounted to the inside of outer plastic shell 88 and penetrating foam inner liner 92. The tail of length adjustment belt 52 beyond the adjuster emerges to bottom seating surface 14 of foam inner liner 92. By means of harness length adjustment means 82, length adjustment belt 52 can be made either longer or shorter allowing the harness to accommodate various sizes of infants.

Shoulder belt height adjuster means 100 include elongated hourglass slots 34 in outer plastic shell 88 and corresponding hourglass slots 64 in molded foam liner at the point where each shoulder belt passes through them. The slots are of sufficient width to accommodate the shoulder belts and sufficient height so that the belts are free to move from a low position to fit a small infant to a high position to fit a larger infant, or alternatively, any position in-between. The width of each slot may be constricted between the low position and the high position (or intermediate positions if allowed) to minimize the loss of seating surface provided that it is wide enough that each shoulder belt can easily deform and move between the low position and the high position. Adjustment panel 142 is moveably secured to the outside of molded outer plastic shell 88 and is provided with left and right belt height positioning means 80 through which the left and right shoulder belts pass as they travel from the seating side of the foam inner liner to behind the outer plastic shell. Adjustment panel 142 and associated belt height positioning means 80 are allowed to travel so that belt height positioning means 80 travel between the lowest allowable shoulder belt position to the highest shoulder belt position.

The shoulder belts are secured in any of several height positions (in the preferred embodiment, only a low and a high position are illustrated in FIG. 3a) by securing adjustment panel 142 to outer plastic shell 88 in any of several corresponding positions. This fastening can be of several means, the preferred being a spring biased engagement block 132 mounted to adjustment panel 142 such that projections 122 on engagement block 132 engage through holes 39 in the outer plastic shell. The spring biased engagement block 132 can be easily disengaged from the molded plastic shell by means of height adjustment knob 114 connected to it by screw attachment 134 and accessible from the back of the outer plastic shell. Moving the shoulder belt height is easy-to-understand and physically intuitive, the operator simply pulls height adjustment knob 114 and moves adjustment panel 142 (and thus the shoulder belts by virtue of their threading into belt height positioning means 80) to the desired position. Moving adjustment panel 142 up raises the shoulder belts while moving this panel down lowers the shoulder belts.

Figure 10:
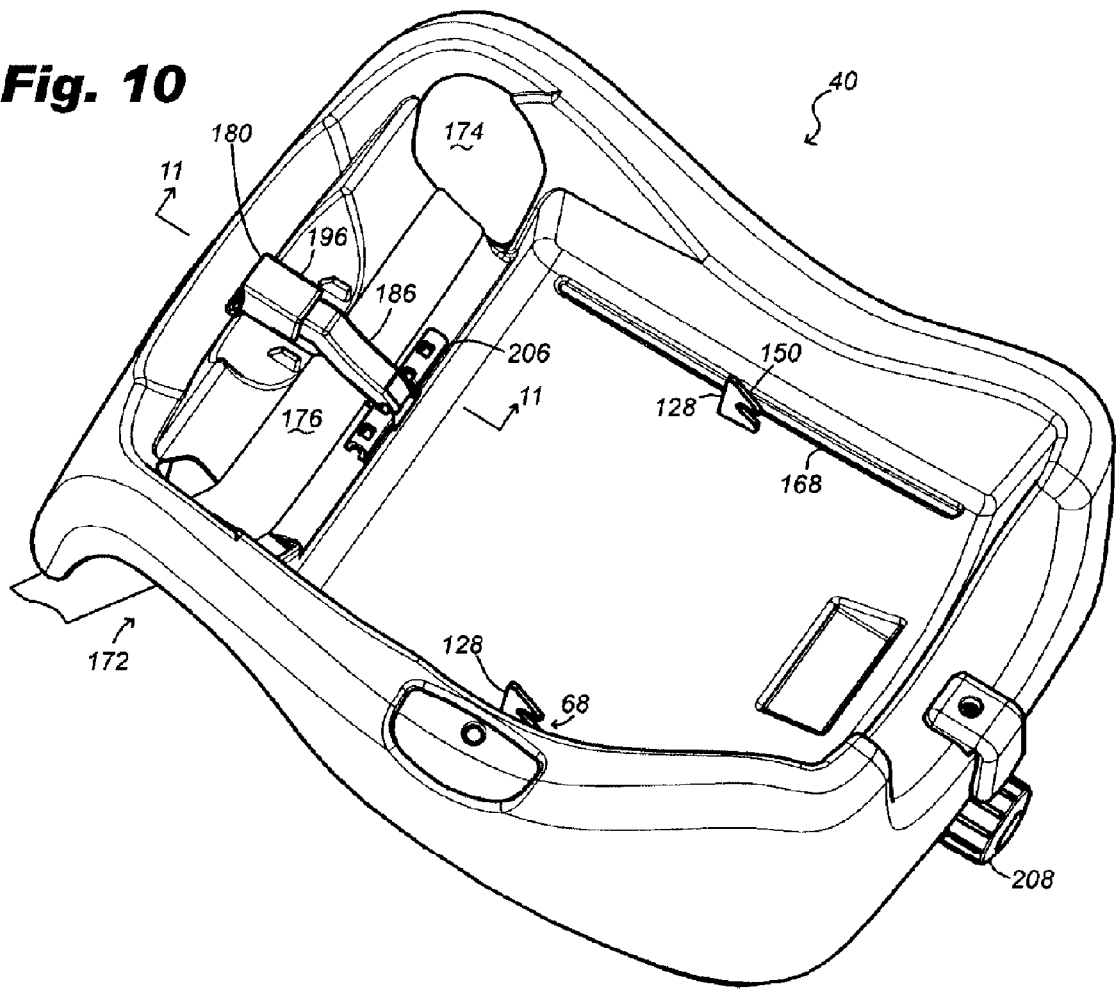
FIG. 10 is a top perspective view of the infant base.

As shown in FIG. 10, receiving base 40 is molded plastic with carrier seat receiving contours which mate with infant carrier 20 as well as with curved runners 96 of the infant carrier. The underside of lower surface 170 rests on an automobile seat. Near one end, the base has an opening on either side (172, 174) which allows passage of and retention of an automobile seat belt 176 and a relatively linear path between the two openings so that the automobile seat belt can pass directly from one opening to the other. These two openings and linear path form an automobile belt path.

Figure 13:
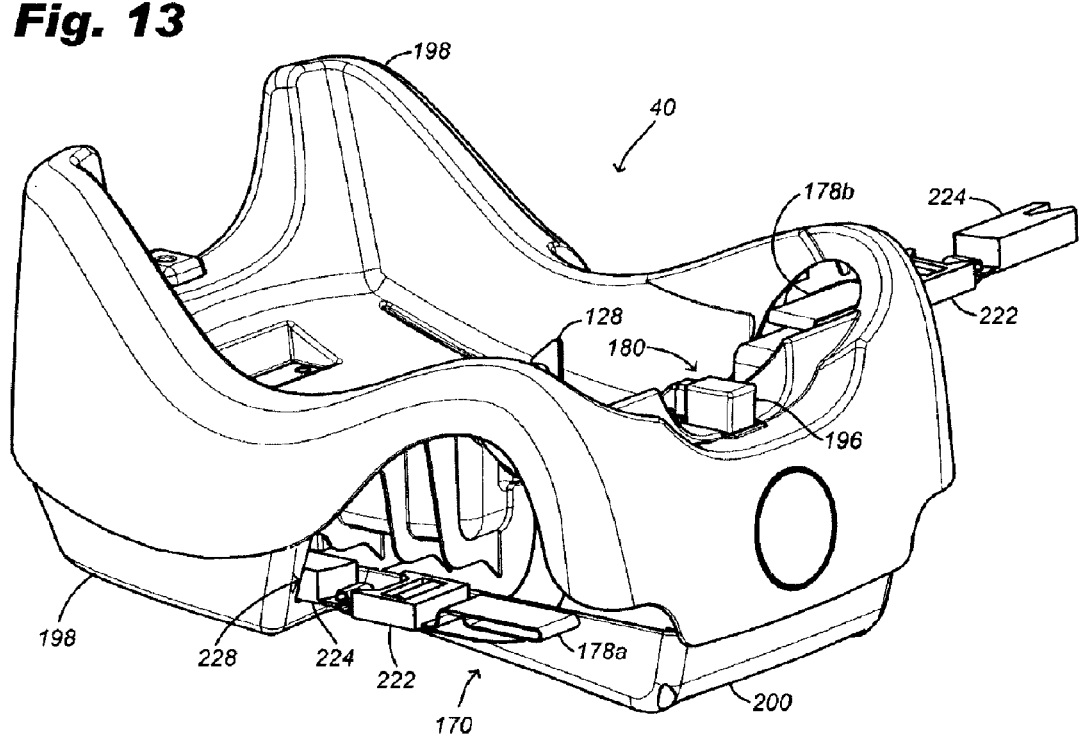
FIG. 13 is a front perspective view of the infant base illustrating LATCH belts.

Although the user can use an automobile seat belt to secure receiving base 40 into an automobile, newer automobiles have special fixed anchorages for children's car seats, and the manufacturers of children's car seats also supply custom belt systems which must be permanently attached to the children's car seats. This system is known as LATCH. The belt path described above also accommodates the LATCH belt system. As shown in FIG. 13, receiving base 40 has a LATCH belt, or more properly, two LATCH belts 178a, 178b. A left LATCH belt 178a attaches to the belt path near its left end, and a right LATCH belt 178b attaches to the belt path near its right end. Thus the left and right LATCH belts are independently secured to receiving base 40 and, since their ends are secured, there is no relative movement possible between receiving base 40 and any LATCH belt as would be possible if the LATCH belt were one continuous piece. As shown in FIG. 15, the LATCH belt ends are stored in storage compartments within receiving base 40. Each LATCH belt end 224 has a respective storage region 228 in the fixed component 198. Posts 226 interface with clasps 224 on each LATCH belt for convenient storage thereof in conjunction with LATCH belt adjusters 222 of the LATCH belts.

Figure 12:
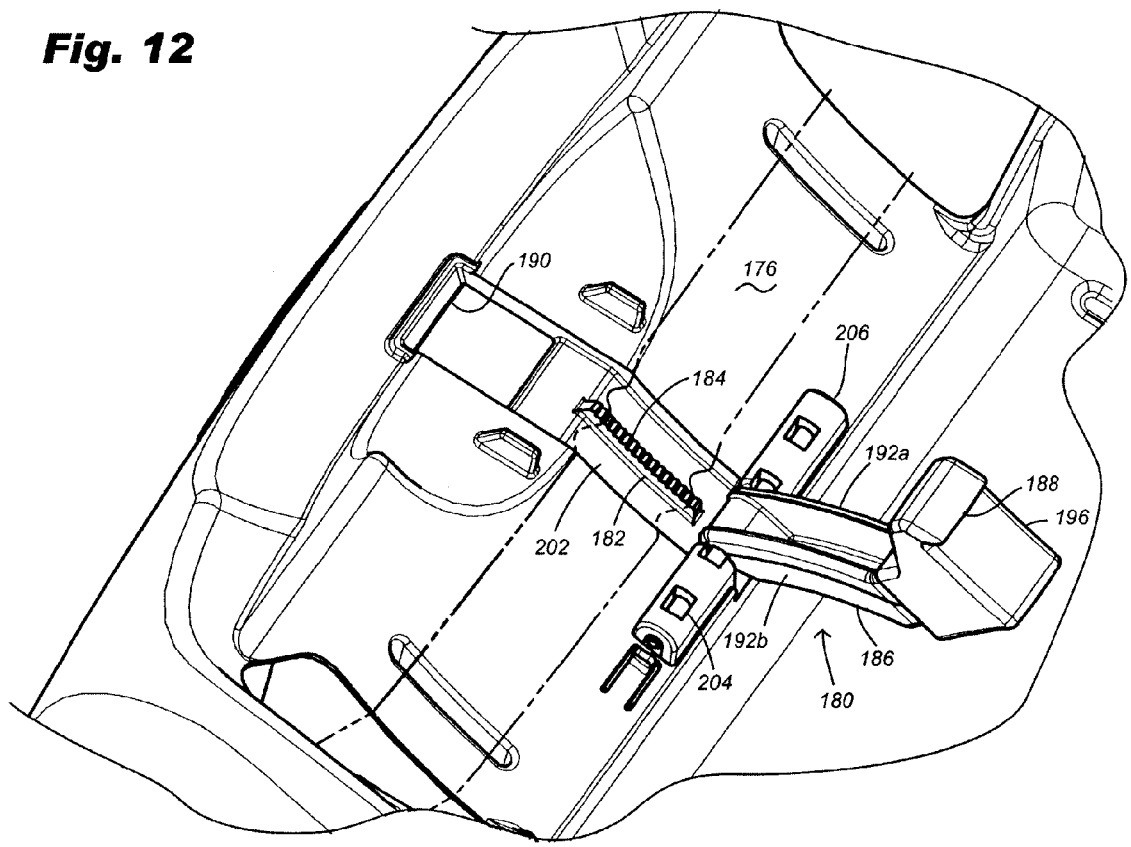
FIG. 12 is a fragmentary top perspective view of the belt lock-off in its open position.

When an automobile seat belt is used to secure the base in an automobile the automobile seat belt 176 is routed across the belt path from one opening 172 to the other 174 and secured. If an automobile seat belt with a shoulder belt is used, both are passed across the belt path. Slack is then worked out of the automobile seat belt and it is made as tight as possible and thus secures the base as securely as possible to the automobile seat. As shown in FIG. 12, the base is provided with lock-off 180 located in the belt path to more firmly secure the automobile seat belt to the base and help prevent any sideward relative sliding between the base and the automobile seat belt. The lock-off further aids in securing the base when the automobile lap/shoulder belt has a free-sliding latch plate and an emergency locking shoulder belt by clamping the lap and shoulder belts together and minimizing potential movement between them. Lock-off 180 comprises a transverse groove 202 in receiving base 40 in the central part of the belt path. A raised rib 182 with a knurl 184 is positioned in the center of transverse groove 202. Hollow channel lock-off beam 186 is pivotally attached to receiving base 40 at one end of transverse groove 202 through apertured openings in beam channel 186 through which is inserted pivot pin 204 captured within pivot housing 206 and can pivot from an open position (FIG. 12) to a closed position (FIG. 10) where it is essentially parallel to the transverse groove.

Figure 11:
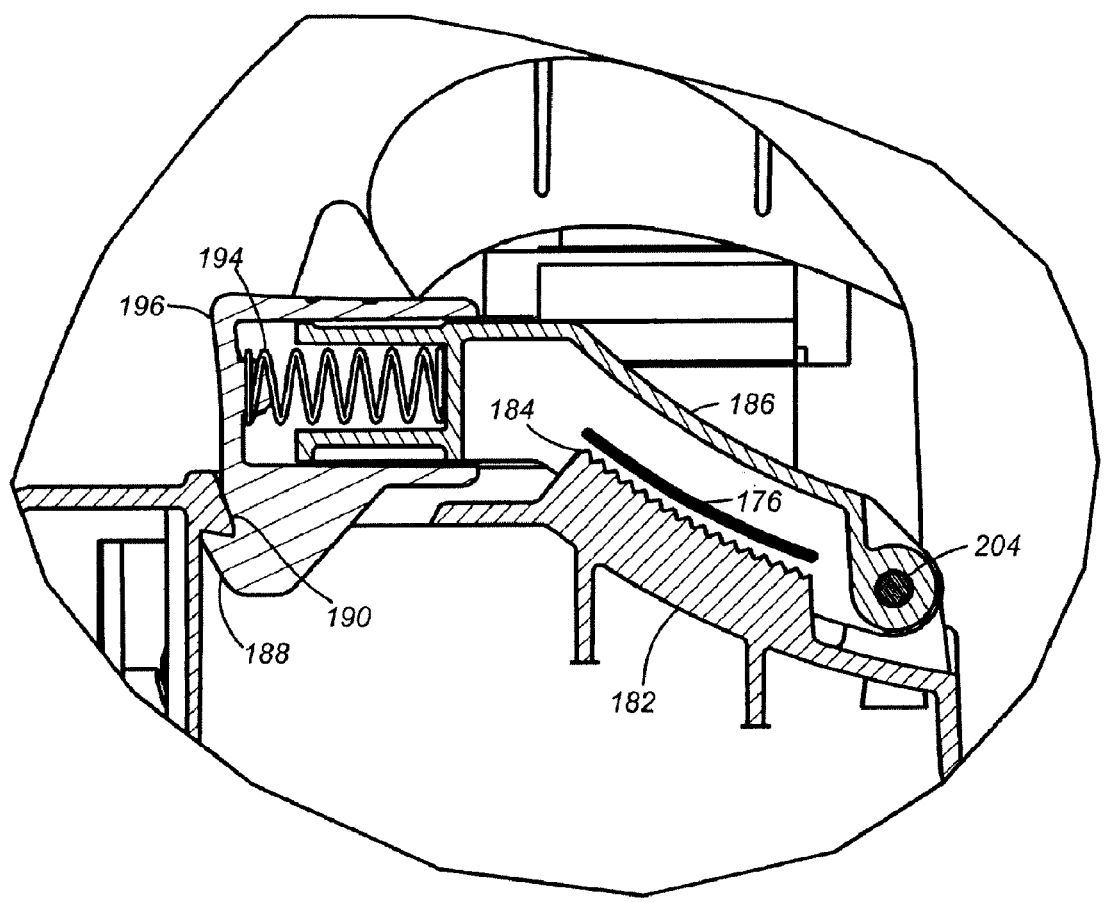
FIG. 11 is an enlarged cross-sectional view of the belt lock-off taken along line 11-11 of FIG. 10.

As shown in FIG. 11, lock-off beam 186 can be secured in the second, essentially parallel position by any of several means, the preferable being spring-biased 194 plunger 196 on its free end whereby the spring-biased plunger has a protruding lip 188 which can engage a similar reversed lip 190 in the base. Lock-off beam is provided with left extending wall 192a and right extending wall 192b which fall in transverse groove 202 in receiving base 40 on either side of knurled 184 rib 182 in the transverse groove. When the automobile seat belt (or seat belt and combined shoulder belt) are captured between transverse groove 202 with knurled 184 rib 182 and the extending walls (192a, 192b) of lock-off beam 186, they are forced into a "W" form and pushed into the knurled rib thus greatly diminishing the ability of the seat belt(s) to move relative to receiving base 40.

Lower surface 170 of receiving base 40 is divided into two parts, one of which is fixed 198, the other which is movably attached 200 to the base so that it can control the angle of the base relative to horizontal, thus changing the angle of the infant carrier and the infant's seating angle. In the preferred embodiment, fixed base component 198 is secured to the bottom of receiving base 40 and movable base component 200, in the form of a front foot, protrudes from an opening in the front of fixed base component 198 and is guided by any of several means on a vertical axis within a defined range of travel. The more front foot 200 protrudes, the more reclined the seating angle.

Figure 14:
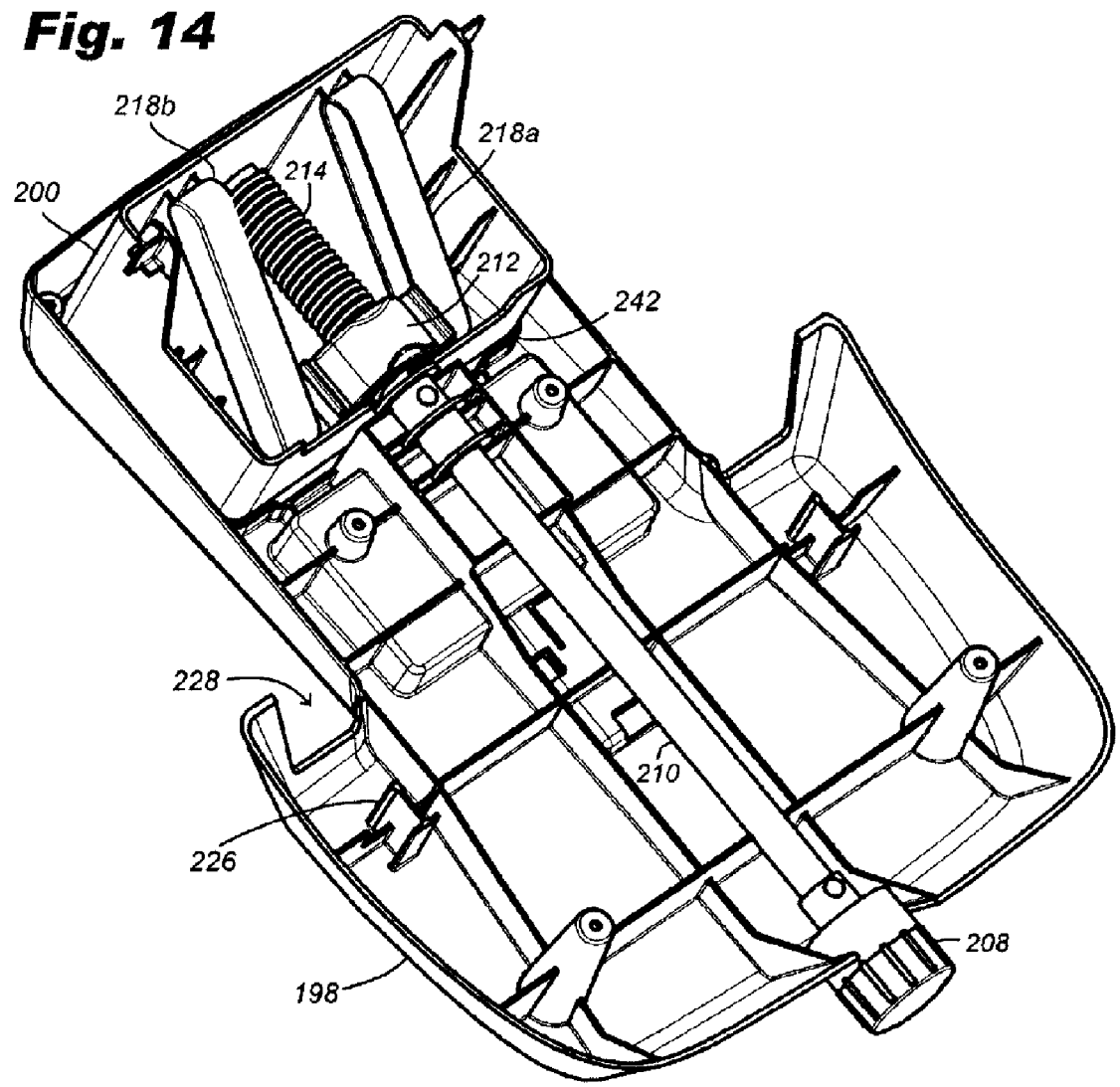
FIG. 14 is an assembly view of the base with the top of the base removed to illustrate the height adjustment mechanism

Angular control of the movable panel is achieved by turning knob 208 on threaded rod 210 running the length of receiving base 40 and rotatably attached to the base. Turning knob 208 moves a matingly threaded follower 212 on threaded portion 214 of rod 210. Lateral extensions 216 (of which only one is shown in FIG. 14a) on follower 212 drive against inclined track 218a or 218b, the top portion of 218b being removed for purposes of illustration in FIG. 14a, on front movable base component 200 driving the movable base component out of telescoping opening 242 if the knob is turned one direction and in if the knob is turned in the opposed direction. Knob 208 is accessible at all times and adjustment can be affected with infant carrier 20 on receiving base 40 or not on the base. Access is continuously available without removing or unfastening the automobile seat belt or LATCH belt.

Figure 14B:
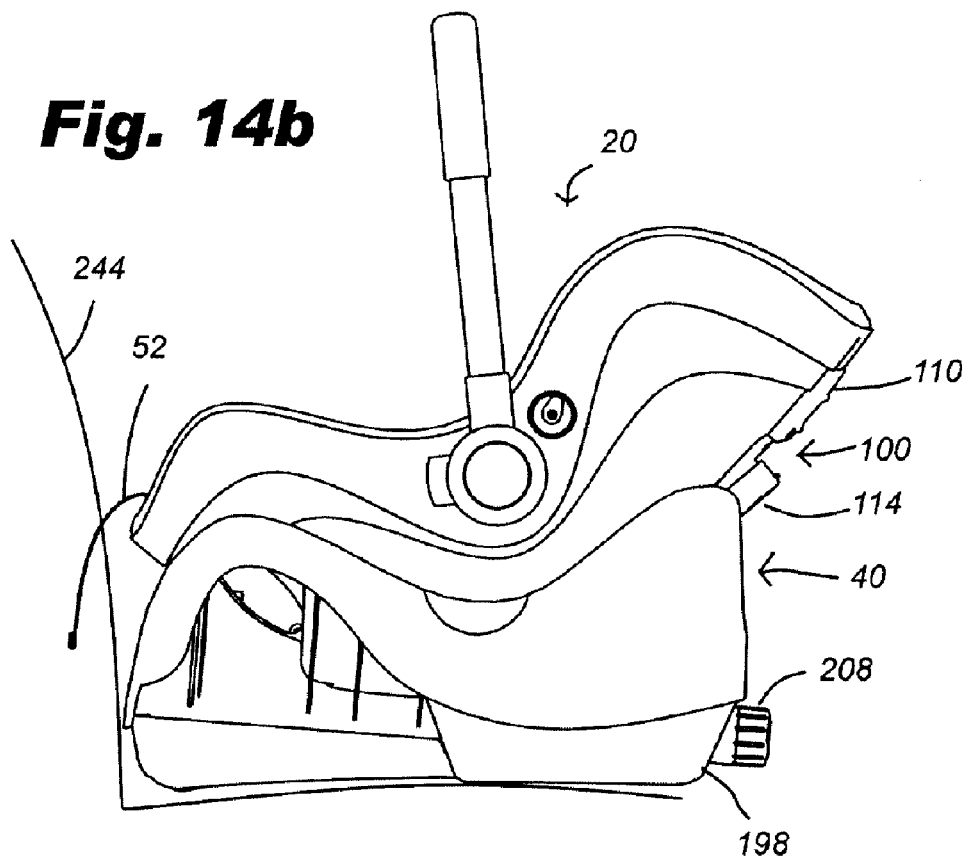
FIG. 14b is a side view of the infant carrier and base with the movable portion in its retracted position positioned on a rear automobile car seat showing a more upright infant seating position.
Figure 14C:
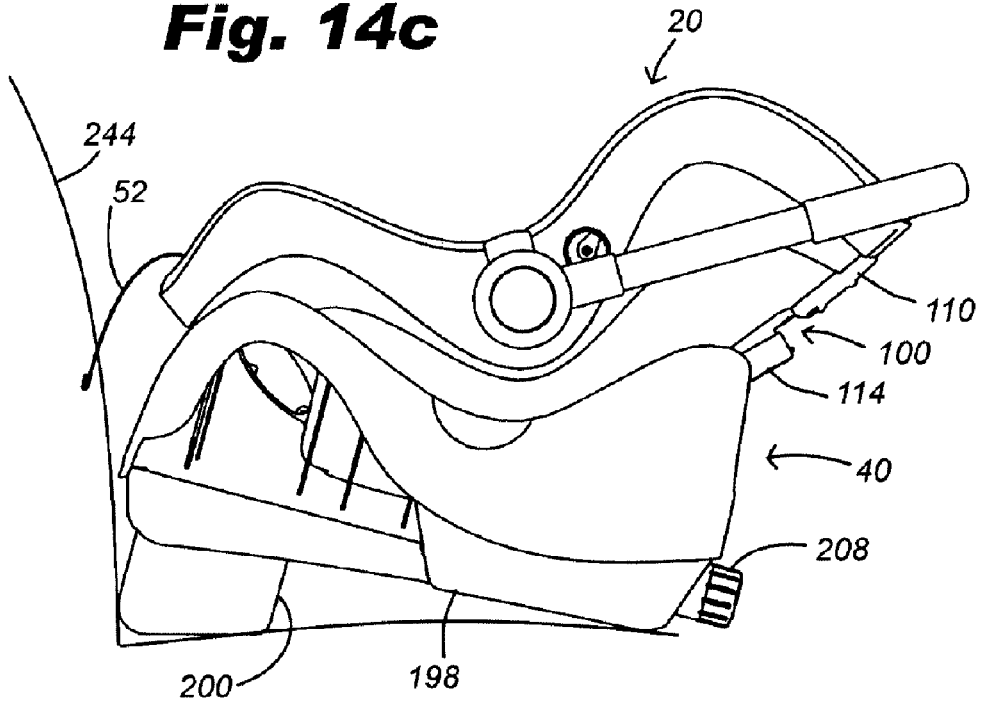
FIG. 14c is a side view of FIG. 14b with the movable portion in its extended position on a rear automobile car seat showing a more reclined infant seating position.

As better illustrated in FIG. 14b and FIG. 14c, infant carrier/car seat combination 10 is positioned into rear vehicle seats 244 in a manner which reverses the designations of front and rear discussed in this application. The front of combination 10 is placed toward the rear of the car seat, thereby allowing a user complete access to belt height adjustment means 100, release means 110 and base height adjustment knob 208 which as discussed previously, are positioned at a rear of carrier 20, but are now facing toward the front of an automobile. In addition, belt length adjustment is also accessible to a user in that belt length adjustment web protrudes from the carrier from a top surface thereof.

In an alternate embodiment, fixed base component 198 is permanently attached to the rear of the base and has a bottom contour which is somewhat concave in the middle so that it will not rock on a contoured automobile seat. Moveable base component 200 is attached to the base on a transverse axis near the bottom of the base and near the center of the base length, and can pivot on that axis within a defined angle. Links attached to the follower and the movable panel changes the angle of the moveable panel as the knob is turned and the follower moves.

Figure 16:
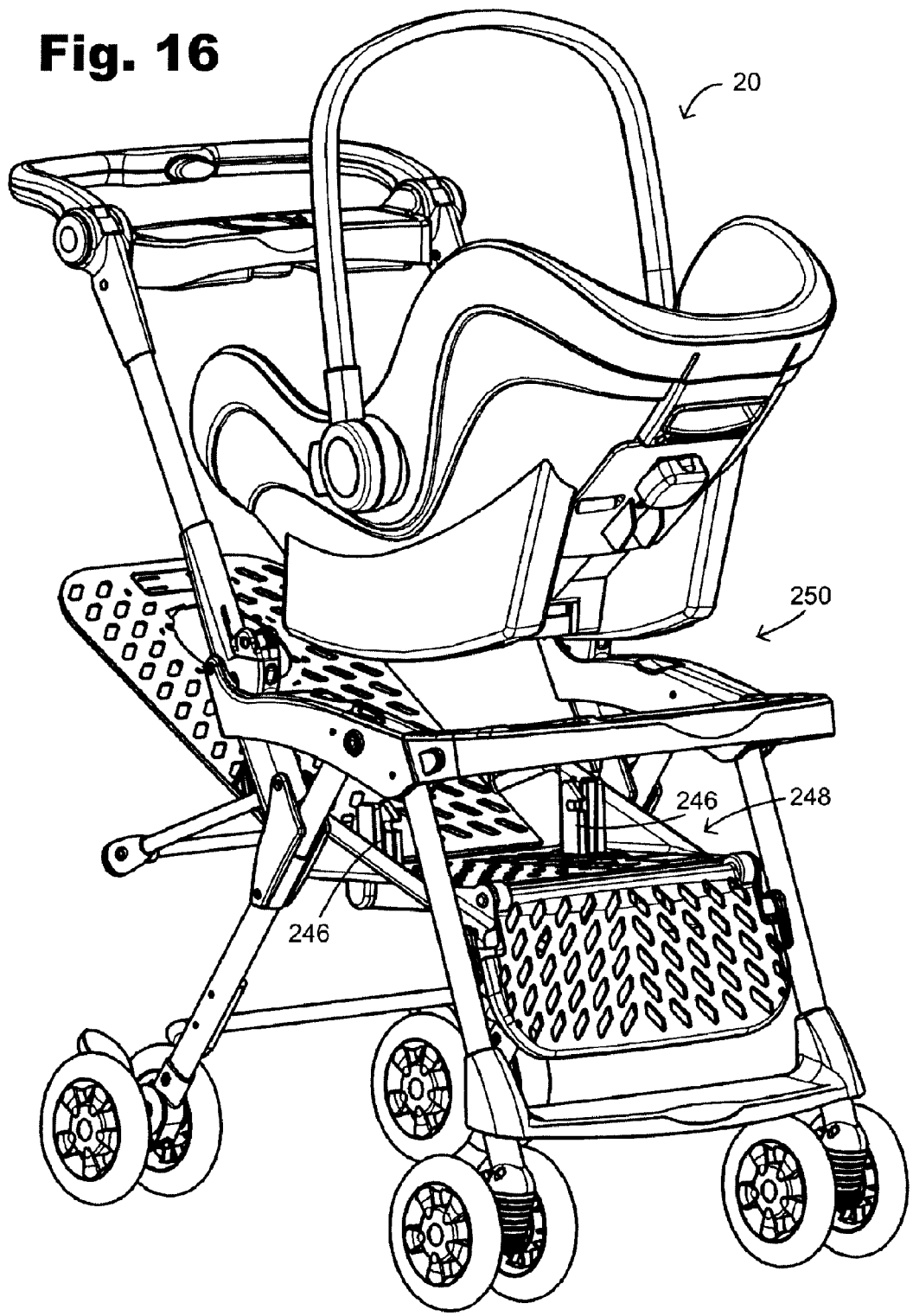
FIG. 16 is a front perspective view of an infant carrier positioned above a carriage stroller prior to fastening engagement with a pair of forwardly-facing upwardly-extending J-shaped hooks, the carrier illustrated with belt restraining web removed.

While the invention has been described with reference to the combination of an infant carrier 20 positioned in a receiving base 40, there is no need to limit the invention to such. In fact, what is important is that the receiving base have at least one upwardly extending essentially J-shaped hook for releasably securing engagement therewith. In one embodiment of this invention, receiving base 40 is substituted with carriage stroller 250 which as illustrated in FIG. 16, has a pair of upwardly-extending forward-facing J-shaped hooks 246 for insertion into corresponding openings 104 in rocker base 96 of carrier 20 (not shown). J-shaped hooks 246 are dimensioned such that downward positioning of infant carrier toward floor 248 will effect engagement of rod 126 into slotted openings of the hooks in a manner analogous to that described previously with respect to FIG. 6.

This invention has been described in detail with reference to specific embodiments thereof, including the respective best modes for carrying out each embodiment. In the foregoing description, certain terms have been used for brevity, clearness and understanding; but no unnecessary limitations are to be implied there from beyond the requirements of the prior art, because such terms are used for descriptive purposes and are intended to be broadly construed.

What is claimed is:

1. An infinitely variable means for adjusting an angle of a movable foot within a fixed base by translating rotational axial movement into vertical axial movement which comprises:
   (a) at least a partially threaded rod inside said fixed base, said rod penetrating through said base and having a knob disposed at said penetrating end;
   (b) a follower for axial movement on said rod at said threaded end
   (c) at least one follower extension on said follower; and
   (d) an inclined surface for impingement with said at least one follower extension, and wherein
   (e) said movable foot has at least one laterally extending projection on each side of said movable foot for insertion into a mating groove in said fixed base, thereby defining a vertical axis within a defined range of travel.

2. The infinitely variable means for adjusting said angle of claim 1 wherein
   (a) said at least one follower extension is at least two follower extensions on essentially opposed sides of said follower.

3. A handle adjustment means which comprises:
   (a) an outwardly-biased sliding plate having a sliding plate elongated aperture and a non-elongated sliding plate aperture disposed therein;
   (b) a fixed guide plate having a fixed guide plate elongated aperture and a non-elongated fixed guide aperture disposed therein, said fixed guide plate adjacent said sliding plate;
   (c) a gear segment having at least two slotted positions therein, said gear segment adjacent said fixed guide plate;
   (d) an axle shaft for rotation of said handle thereabout, said axle extending through said sliding plate elongated aperture and said non-elongated fixed guide plate aperture; and
   (e) a protruding pin attached to said sliding plate in said non-elongated sliding plate aperture and in said elongated fixed plate aperture for positioning into said at least two slotted positions.

4. The handle adjustment means of claim 3 which further comprises
   (a) a spring operatively positioned at an end of the sliding plate outwardly-biasing the sliding plate; and
   (b) a button projecting from an end of said sliding plate opposed to said spring-biased end.

5. A shoulder belt height adjustment panel for a carrier which comprises:
   (a) a panel having two openings disposed therein for positioning of a carrier shoulder harness;
   (b) said panel slidable between a pair of essentially parallel rails positioned on a rear surface of said carrier;
   (c) said slidable panel movable between at least a first and a second position by overcoming an inwardly biased pull knob by the application of an opposing pulling force by a user using one hand, said pull knob comprising a spring operatively positioned between an inner portion of said pull knob and an inner side of said panel, said at least first and second positions are defined by at least two openings on a rear panel of said carrier into which at least one protrusion on an inner side of said inner portion of said pull knob is biased, said pull knob adapted to be pulled outwardly from adjacent an outer face of said panel by a user with said one hand and compressing said spring for sliding panel movement between said at least two distinct positions on the rear panel; and
   (d) an inner face of said panel in adjacency with an outer face of said carrier.

6. The panel of claim 5 wherein
   (a) at least a portion of said inwardly biased pull knob is positioned adjacent an outer face of said panel outwardly above said pair of openings.

7. An infant seat carrier comprising:
   (a) a seat with a seating surface and a back surface having two openings therein;
   (b) a restraining harness comprising a crotch strap, two shoulder straps and a buckle removably connected to said shoulder straps and said crotch strap and wherein
      (i) said two shoulder straps passing through said openings in said back surface, and wherein said openings are elongated to allow said shoulder belts to pass through said back surface at multiple distances from said seating surface;
   (c) an adjusting means controlling said multiple distances wherein said adjusting means comprises:
      (i) a panel slidably attached to a rear of said back surface, said panel moveable parallel to said back surface toward or away from said seating surface, said panel having at least one opening for passage of said two shoulder straps;
      (ii) a means to locate said panel in at least two distinct positions comprising a pull knob comprising a biased plunger between an inner side of said panel and said back surface and a spring operatively positioned between said biased plunger and the inner side of said panel and having at least one protrusion on an inner side of said knob and at least two openings on a rear panel of said carrier for insertion of said at least one protrusion on said knob thereby controlling a height of said shoulder belts from said seating surface, said pull knob adapted to be pulled outwardly from adjacent an outer face of said panel by a user with one hand and compressing said spring for sliding panel movement between said at least two distinct positions on the rear panel.

8. The carrier of claim 7 wherein
   (a) said means to locate said panel comprises the biased plunger engaging said back surface and capable of securing said panel in at least two distinct positions.

9. The carrier of claim 8 wherein
   (a) said panel is captured within a track.

10. The carrier of claim 9 wherein
    (a) a first face of said track is formed by a rear of said back surface and a second face of said track is formed by a surface opposing said first face.

11. The carrier of claim 10 wherein
    (a) said attachment of said panel is entirely behind said back surface.

12. The carrier of claim 11 wherein
    (a) at least a portion of said pull knob is positioned adjacent an outer face of said panel and said plunger is above said at least one opening in said panel.

\* \* \* \* \*